US010093341B2

(12) United States Patent
Johta et al.

(10) Patent No.: US 10,093,341 B2
(45) Date of Patent: Oct. 9, 2018

(54) STEERING DEVICE

(71) Applicant: NSK LTD., Tokyo (JP)

(72) Inventors: Masaya Johta, Gunma (JP); Daiki Orihara, Gunma (JP)

(73) Assignee: NSK LTD., Tokyo (JP)

( * ) Notice: Subject to any disclaimer, the term of this patent is extended or adjusted under 35 U.S.C. 154(b) by 51 days.

(21) Appl. No.: 15/506,389

(22) PCT Filed: Dec. 7, 2015

(86) PCT No.: PCT/JP2015/084245
§ 371 (c)(1),
(2) Date: Feb. 24, 2017

(87) PCT Pub. No.: WO2016/114034
PCT Pub. Date: Jul. 21, 2016

(65) Prior Publication Data
US 2018/0222519 A1    Aug. 9, 2018

(30) Foreign Application Priority Data

Jan. 13, 2015 (JP) ................................. 2015-004324

(51) Int. Cl.
*B62D 1/19* (2006.01)
*B62D 1/184* (2006.01)
(Continued)

(52) U.S. Cl.
CPC ............. *B62D 1/192* (2013.01); *B62D 1/184* (2013.01); *B62D 1/189* (2013.01); *B62D 1/185* (2013.01); *B62D 1/19* (2013.01); *B62D 1/195* (2013.01)

(58) Field of Classification Search
CPC ........ B62D 1/192; B62D 1/189; B62D 1/184; B62D 1/19; B62D 1/195; B62D 1/185
See application file for complete search history.

(56) References Cited

U.S. PATENT DOCUMENTS 8,590,933 B2 * 11/2013 Narita .................... B62D 1/184
280/777
2015/0344064 A1 * 12/2015 Tanaka ................... B62D 1/195
280/777

(Continued)

FOREIGN PATENT DOCUMENTS

JP      55-11360 U    1/1980
JP      64-36281 U    3/1989
(Continued)

OTHER PUBLICATIONS

International Search Report for PCT/JP2015/084245 dated Mar. 8, 2016 [PCT/ISA/210].

*Primary Examiner* — Karen Beck
(74) *Attorney, Agent, or Firm* — Sughrue Mion, PLLC

(57) ABSTRACT

A steering device includes a cylindrical inner column that supports an input shaft connected to a steering wheel so as to allow the input shaft to be rotatable, a cylindrical outer column into which at least a part of the inner column is inserted, and a cylindrical lower column that supports an output shaft connected to the input shaft so as to allow the output shaft to be rotatable and is supported by a dash panel. The lower column moves to a rear side at the time of a primary collision, and the inner column and the outer column move relative to each other at the time of a secondary collision.

9 Claims, 18 Drawing Sheets

(51) Int. Cl.
*B62D 1/189* (2006.01)
*B62D 1/185* (2006.01)

(56) References Cited

U.S. PATENT DOCUMENTS

2017/0297607 A1* 10/2017 Orihara .................. B62D 1/192
2018/0099688 A1*  4/2018 Ito ......................... B62D 1/192

FOREIGN PATENT DOCUMENTS

| | | |
|---|---|---|
| JP | 2006-182062 A | 7/2006 |
| JP | 2008-162422 A | 7/2008 |
| JP | 2012-250651 A | 12/2012 |
| WO | WO-2012017854 A1 * | 2/2012 ............. B62D 1/184 |

* cited by examiner

STEERING DEVICE

CROSS REFERENCE TO RELATED APPLICATIONS

This application is a National Stage of International Application No. PCT/JP2015/084245, filed on Dec. 7, 2015, which claims priority from Japanese Patent Application No. 2015-004324, filed on Jan. 13, 2015, the contents of all of which are incorporated herein by reference in their entirety.

FIELD

The present invention relates to a steering device.

BACKGROUND

A structure in which a steering device is supported by a dash panel (toe board) is known as a structure for supporting a steering device that gives a steering angle to wheels according to the rotation of a steering wheel. For example, in Patent Literature 1, a steering column device is fixed to a vehicle body at two positions, that is, an insertion hole that is provided in a dash panel and a fixing portion that is positioned on the rear side of the dash panel. Further, Patent Literature 1 discloses that energy is absorbed by the relative movement of a first lower jacket with respect to a second lower jacket at the time of a secondary collision where a driver (operator) collides with a steering wheel.

CITATION LIST

Patent Literature

Patent Literature 1: JP 2006-182062 A

SUMMARY

Technical Problem

Incidentally, it is preferable that a steering device includes an energy absorbing structure for a primary collision where a vehicle body collides and an energy absorbing structure for a secondary collision in order to reduce the damage of a collision accident. Since a rearward collision load is applied to the dash panel at the time of a primary collision, the dash panel and a mounting portion of the steering device are pushed rearward. For this reason, a structure in which a lower column (a column mounted on the dash panel) moves relative to an intermediate column (a column fitted to the lower column on the front side) is used to absorb the energy of a primary collision. On the other hand, it is preferable that a stroke (the movable distance of the column) at the time of a primary collision and a stroke (the movable distance of the column) at the time of a secondary collision are long for the improvement of energy absorption capability. However, in the related art, the stroke at the time of a primary collision and the stroke at the time of a secondary collision are obtained from the relative movement between the lower column and the intermediate column. For this reason, since the stroke at the time of a primary collision is shortened as much as that when the stroke at the time of a secondary collision is lengthened, there has been a possibility that the stroke at the time of a primary collision might not be sufficient.

The invention has been made in consideration of the above-mentioned problems, and an object of the invention is to provide a steering device that can improve both energy absorption capability at the time of a primary collision and energy absorption capability at the time of a secondary collision.

Solution to Problem

To achieve the above-mentioned object, a steering device according to the invention includes a cylindrical inner column that supports an input shaft connected to a steering wheel so as to allow the input shaft to be rotatable, a cylindrical outer column into which at least a part of the inner column is inserted, and a cylindrical lower column that supports an output shaft connected to the input shaft so as to allow the output shaft to be rotatable and is supported by a dash panel. The lower column moves to a rear side at the time of a primary collision, and the inner column and the outer column move relative to each other at the time of a secondary collision.

Accordingly, an impact at the time of a primary collision is absorbed by the movement of the lower column, and an impact at the time of a secondary collision is absorbed by the movement of the inner column. Further, even though the movable distance of the inner column at the time of a secondary collision is set to be long, the movable distance of the lower column at the time of a primary collision is not shortened. Accordingly, the steering device according to the invention can improve both energy absorption capability at the time of a primary collision and energy absorption capability at the time of a secondary collision.

As a desirable embodiment of the invention, the steering device includes a first hole that is provided in the inner column, a first slit of the outer column that is formed by notching one end of the outer column, the one end being a side into which the inner column is inserted, an outer column bracket that is fixed to a vehicle body-side member and clamps and supports the outer column together with holding force-increasing members, an inner column bracket which is supported by the holding force-increasing members and in which a second hole is formed, and a shear pin that connects the inner column bracket to the inner column at a position across the first and second holes so that the inner column bracket and the inner column are detachable from each other. An inner wall of the outer column is in contact with an outer wall of the inner column in a state in which the outer column is clamped, and a telescopic position of the inner column is adjustable in a state in which the clamping of the outer column is released.

In the steering device according to the invention, the lower column moves to the rear side when a collision load is applied to the dash panel at the time of a primary collision. Further, when a collision load is applied to the steering wheel at the time of a secondary collision, the collision load is transmitted to the inner column through the input shaft. On the other hand, the inner column bracket supported by the holding force-increasing members does not move. For this reason, since a shear force is applied to the shear pin, the shear pin is cut in a case in which the collision load exceeds the allowable shear force of the shear pin. Since the connection between the inner column and the inner column bracket is released when the shear pin is cut, the inner column is supported by a frictional force between the inner column and the outer column. Accordingly, the inner column and the outer column can move relative to each other. Therefore, in the steering device according to the invention, a stroke at the time of a primary collision is obtained from the rearward movement of the lower column and a stroke at the time of a secondary collision is obtained from the forward movement of the inner column. That is, a mechanism, which absorbs energy at the time of a secondary collision, is formed of a different member that is provided at a position different from the position of a mechanism for absorbing energy at the time of a primary collision. Accordingly, the steering device according to the invention can improve both energy absorption capability at the time of a primary collision and energy absorption capability at the time of a secondary collision.

As a desirable embodiment of the invention, it is preferable that the outer column includes a second slit that is provided at a position different from the position of the first slit, the second slit being an elongated hole extending in an axial direction of the outer column, a stopper is mounted on a portion of the inner column exposed to the second slit, and the stopper comes into contact with a second end portion-inner wall after a secondary collision, the second end portion-inner wall being an inner wall of a front end portion of the second slit.

Accordingly, since a stroke at the time of a secondary collision is regulated to a predetermined value or less, the excessive forward movement of the inner column at the time of a secondary collision is suppressed. For this reason, the position of the steering wheel after a secondary collision is kept within a predetermined range. Accordingly, the steering device allows the steering wheel to be easily operated after a secondary collision.

As a desirable embodiment of the invention, it is preferable that the inner column bracket comes into contact with a first end portion-inner wall according to the adjustment of the telescopic position of the inner column, the first end portion-inner wall being an inner wall of a front end portion of the first slit, and in a state in which the inner column bracket is in contact with the first end portion-inner wall, the stopper is present at a position deviating from the second end portion-inner wall.

Accordingly, even though the telescopic position of the inner column is present on the front-most side, the inner column can move to the front side at the time of a secondary collision. That is, regardless of the telescopic position of the inner column, the inner column can move to the front side at the time of a secondary collision. Accordingly, the steering device can improve energy absorption capability at the time of a secondary collision regardless of the telescopic position of the inner column.

As a desirable embodiment of the invention, it is preferable that the steering device includes an intermediate column that is fitted to a front side of the outer column and is fitted to a rear side of the lower column.

In order to guide the lower column at the time of a primary collision, a member, which is fitted to the front portion of the lower column, needs to have a predetermined length or more. In the steering device, the intermediate column guides the lower column. Accordingly, since the length of the outer column in the axial direction is shortened in the steering device, the outer column is easily manufactured.

As a desirable embodiment of the invention, it is preferable that the lower column includes a bush that is an annular elastic member, the bush being provided at a position corresponding to a through-hole provided in the dash panel.

Accordingly, since the bush is elastically deformable, the lower column can oscillate about the front end portion thereof. That is, the lower column can oscillate in the tilt direction within the elastic deformation range of the bush. For this reason, the tilt position of the steering device can be adjusted.

As a desirable embodiment of the invention, it is preferable that the holding force-increasing member is a plate-like member that includes an elongated hole extending in the axial direction of the outer column.

Accordingly, machining, which is required to form the holding force-increasing member, becomes less. For this reason, the steering device is more easily manufactured.

As a desirable embodiment of the invention, it is preferable that the holding force-increasing members are disposed on both sides of the outer column, and the inner column bracket is connected to each of the holding force-increasing members that are disposed on both sides of the outer column.

Accordingly, when a load is applied to the inner column bracket, the inner column bracket receives clamping forces from both sides of the outer column. For this reason, the posture of the inner column bracket, when the shear pin is cut, is stable. Accordingly, the posture of the inner column, when the inner column starts to move, is easily kept straight in the axial direction. Therefore, the inner column easily moves straight in the axial direction.

As a desirable embodiment of the invention, it is preferable that the shear pin is a cylindrical member that includes a guide hole passing through the other end of the cylindrical member from one end of the cylindrical member, the shear pin including an outer pin that passes through the first and second holes and an inner pin that passes through the guide hole and pushes an inner wall of the guide hole to the outside in a radial direction of the guide hole.

Accordingly, since the inner pin is inserted to assemble the steering device after the first and second holes are positioned by the outer pin, the steering device can be easily assembled.

As a desirable embodiment of the invention, it is preferable that the steering device includes a damper that is mounted on the inner column bracket and faces the inner wall of the front end portion of the first slit, in the axial direction of the outer column.

Therefore, when the telescopic position is present on the front-most side, the damper comes into contact with the first end portion-inner wall. When a force is applied to the inner column in a state in which the damper is in contact with the first end portion-inner wall, a reaction force from the first end portion-inner wall is applied to the damper. Accordingly, since the damper is elastically deformed, a part of the force applied to the damper is consumed to elastically deform the damper. Therefore, a force smaller than the force applied to the damper is transmitted to the inner column bracket and a shear force having substantially the same magnitude as the magnitude of the force transmitted to the inner column bracket acts on the shear pin. For this reason, the shear force acting on the shear pin is smaller than the force applied to the inner column. Accordingly, the steering device can protect a detachment mechanism by suppressing the cutting of the shear pin when the telescopic adjustment is performed.

Advantageous Effects of Invention

According to the invention, it is possible to provide a steering device that can improve both energy absorption capability at the time of a primary collision and energy absorption capability at the time of a secondary collision.

DESCRIPTION OF EMBODIMENTS

An embodiment of the invention will be described in detail with reference to the drawings. The invention is not limited by the contents disclosed in the following embodiment. Further, components disclosed below include substantially the same components and the components that can be easily supposed by those skilled in the art. Furthermore, components to be described below can be appropriately combined with each other.

Embodiment

Figure 1:
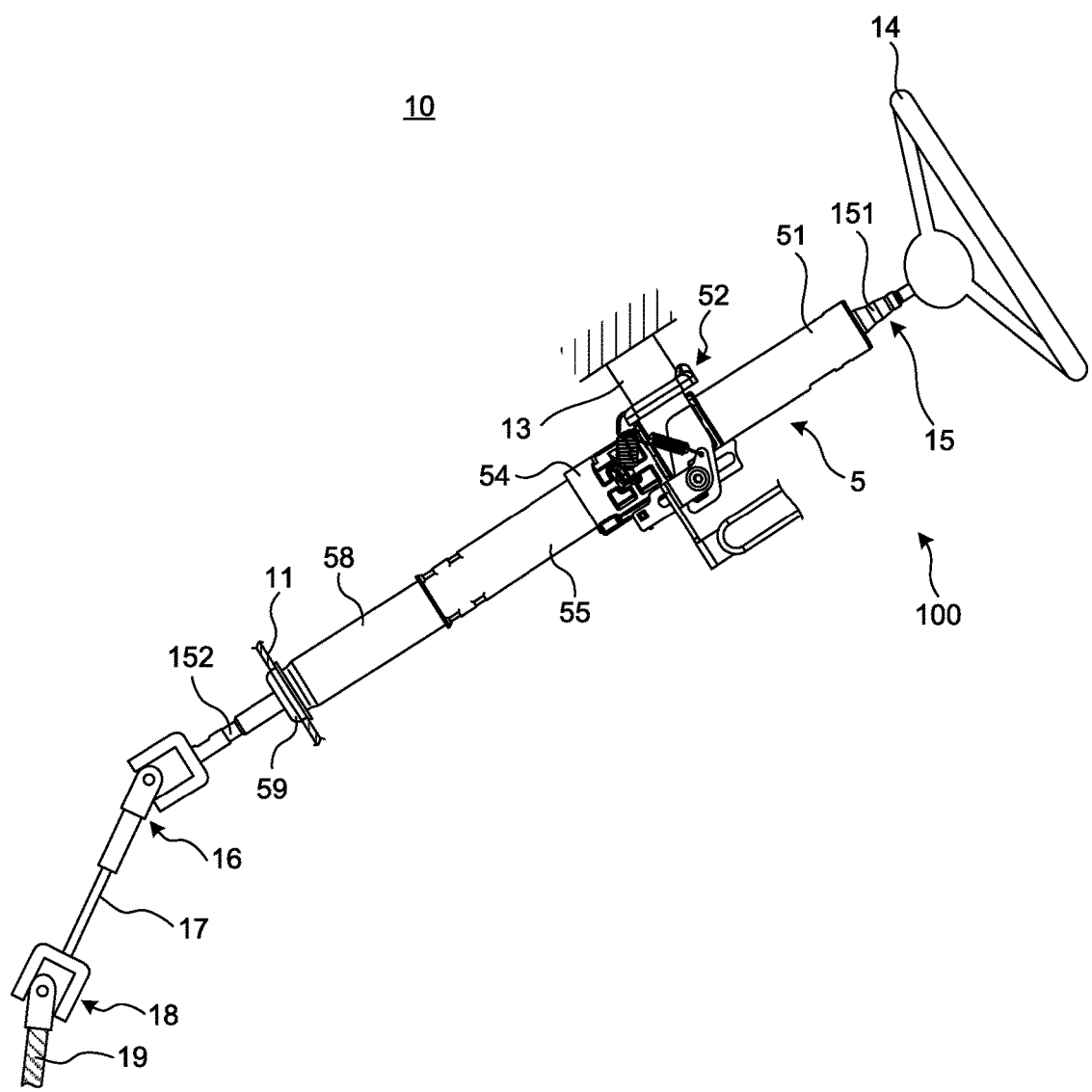
FIG. 1 is a diagram schematically illustrating the periphery of a steering device according to an embodiment.
Figure 2:
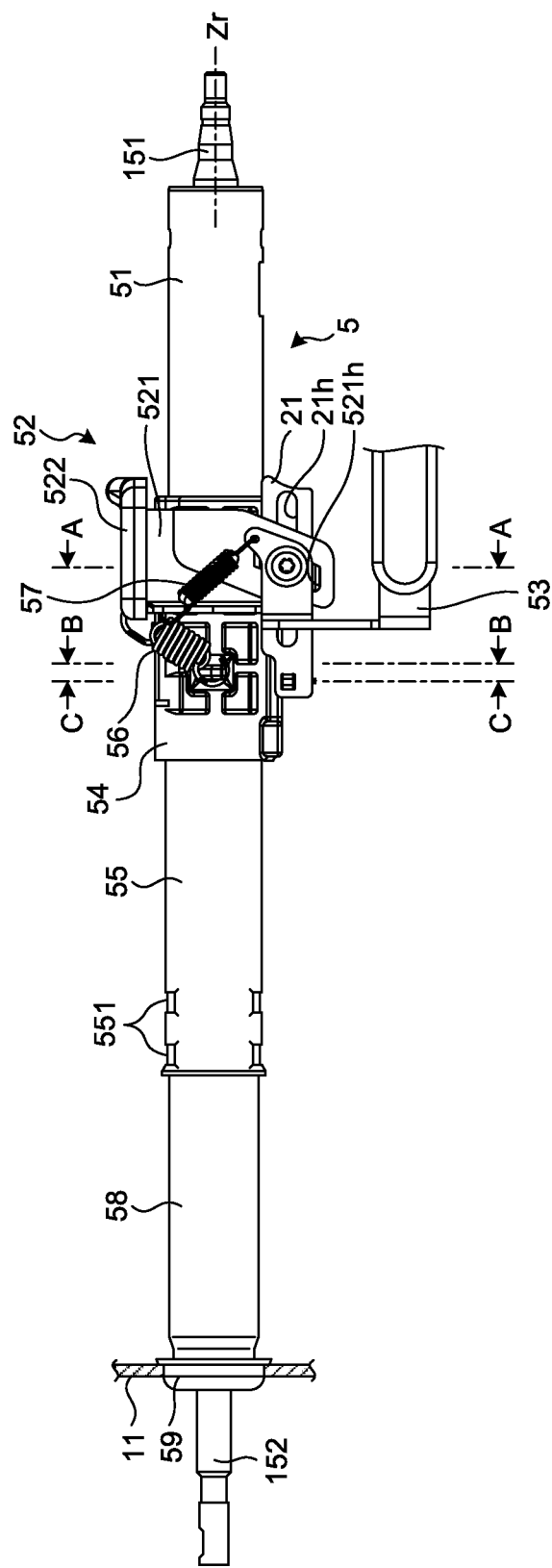
FIG. 2 is a side view of the steering device according to this embodiment.
Figure 3:
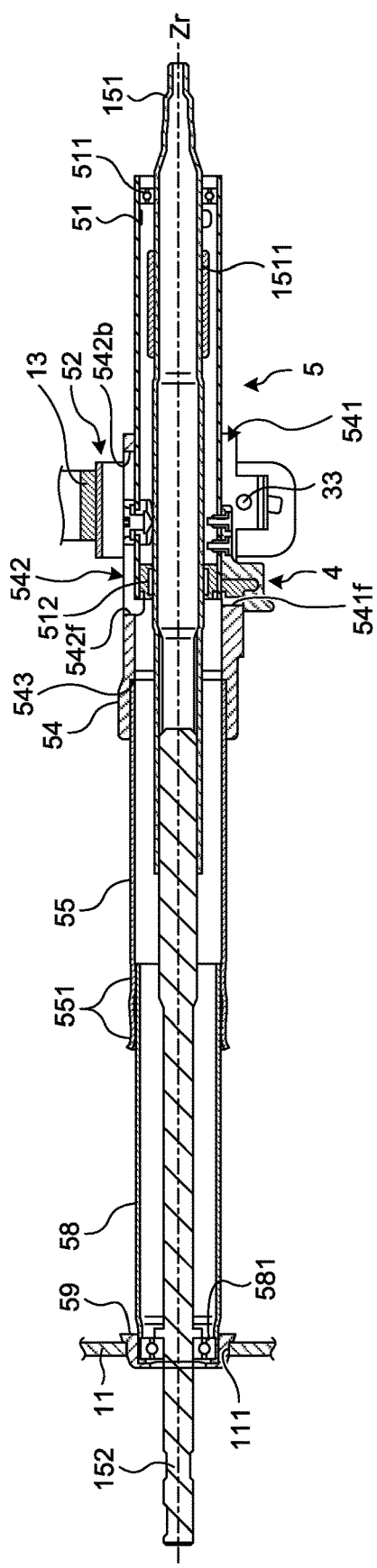
FIG. 3 is a cross-sectional view of the steering device according to this embodiment.
Figure 4:
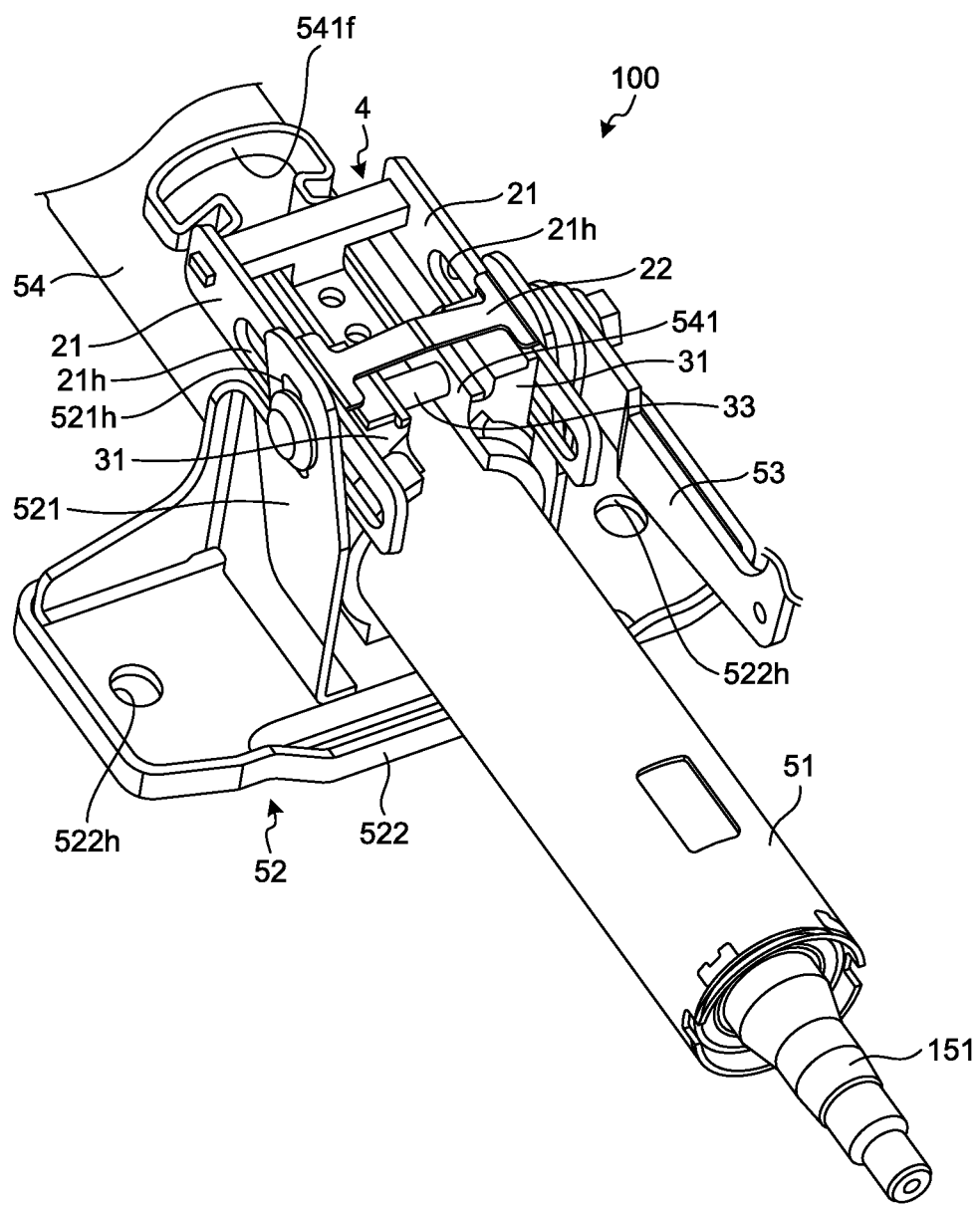
FIG. 4 is a perspective view of the steering device according to this embodiment that is seen from the lower side of a vehicle body.

FIG. 1 is a diagram schematically illustrating the periphery of a steering device according to this embodiment. FIG. 2 is a side view of the steering device according to this embodiment. FIG. 3 is a cross-sectional view of the steering device according to this embodiment. FIG. 4 is a perspective view of the steering device according to this embodiment that is seen from the lower side of a vehicle body. In the following description, the front side of a vehicle body 10 in a case in which a steering device 100 is mounted on the vehicle body 10 is simply referred to as a front side, and the rear side of the vehicle body 10 in a case in which the steering device 100 is mounted on the vehicle body 10 is simply referred to as a rear side. Further, the upper side of the vehicle body 10 in a case in which the steering device 100 is mounted on the vehicle body 10 is simply referred to as an upper side, and the lower side of the vehicle body 10 in a case in which the steering device 100 is mounted on the vehicle body 10 is simply referred to as a lower side. A left side in FIG. 2 is the front side, a right side in FIG. 2 is the rear side, an upper side in FIG. 2 is the upper side, and a lower side in FIG. 2 is the lower side.

(Steering Device)

As illustrated in FIG. 1, the steering device 100 includes a steering wheel 14, a steering shaft 15, a universal joint 16, a lower shaft 17, and a universal joint 18 in the order of transmission of a force applied by an operator, and is joined to a pinion shaft 19.

The steering shaft 15 includes an input shaft 151 and an output shaft 152. One end portion of the input shaft 151 is connected to the steering wheel 14, and the other end portion of the input shaft 151 is connected to the output shaft 152. For example, the surface of the input shaft 151 is coated with a resin. Accordingly, the input shaft 151 is connected to the output shaft 152 with the resin interposed therebetween. One end portion of the output shaft 152 is connected to the input shaft 151, and the other end portion of the output shaft 152 is connected to the universal joint 16. In this embodiment, the input shaft 151 and the output shaft 152 are made of a general steel material, such as carbon steel for machine structural use (SC material), a carbon steel pipe for machine structural use (STKM material), or a cold rolled steel sheet (SPCC material).

One end portion of the lower shaft 17 is connected to the universal joint 16, and the other end portion of the lower shaft 17 is connected to the universal joint 18. One end portion of the pinion shaft 19 is connected to the universal joint 18.

The steering device 100 includes a steering column 5 that supports the steering shaft 15. The steering column 5 includes, for example, an inner column 51, an outer column 54, an intermediate column 55, and a lower column 58. The inner column 51, the outer column 54, the intermediate column 55, and the lower column 58 are disposed in this order toward the front side from the rear side. As illustrated in FIG. 2, the inner column 51 is a cylindrical member that supports the input shaft 151. The outer column 54 is a cylindrical member into which at least a part of the inner column 51 is inserted. The intermediate column 55 is a cylindrical member that is inserted into the outer column 54, and is connected to the outer column 54 by, for example, interference fit. The rear end portion of the intermediate column 55 is in contact with a stepped portion 543 that is formed on the inner wall of the outer column 54. The lower column 58 is a cylindrical member that is inserted into the intermediate column 55, and is connected to the intermediate column 55 by a caulked portion 551 that is provided on the intermediate column 55. For example, the inner column 51, the outer column 54, the intermediate column 55, and the lower column 58 are made of a carbon steel pipe for machine structural use (STKM material), an aluminum alloy for diecasting (ADC material), or the like.

As illustrated in FIG. 3, the inner column 51 supports the input shaft 151 with, for example, a bearing 511 and an intermediate bearing 512 interposed therebetween. The bearing 511 is, for example, a deep groove ball bearing and is disposed on the rear end portion of the inner column 51. The intermediate bearing 512 is, for example, a needle bearing that is covered with synthetic rubber or the like or a bush that is made of a synthetic resin; and is disposed on the front end portion of the inner column 51. Accordingly, the inner column 51 can support the input shaft 151 so as to allow the input shaft 151 to be rotatable about a rotation axis Zr. Further, a key lock collar 1511 is mounted on the input shaft 151. For example, when an operator removes a key, a pin protrudes toward the key lock collar 1511 from the inner column 51 and is fitted to the key lock collar 1511. Accordingly, since the inner column 51 and the input shaft 151 are fixed to each other so as not to allow the inner column 51 and the input shaft 151 to be rotatable relative to each other, the steering wheel 14 cannot be operated in a state in which the key is removed.

As illustrated in FIG. 3, the lower column 58 supports the output shaft 152 with, for example, a bearing 581 interposed therebetween. The bearing 581 is, for example, a deep groove ball bearing and is disposed on the front end portion of the lower column 58. Accordingly, the lower column 58 can support the output shaft 152 so as to allow the output shaft 152 to be rotatable about the rotation axis Zr. Further, the lower column 58 is mounted in a through-hole 111 of a dash panel 11 through a bush 59. That is, the lower column 58 includes the bush 59 at a position corresponding to the through-hole 111. The dash panel 11 is a partition plate that partitions a passenger compartment and an engine room, and includes a toe board. The bush 59 is, for example, an annular member that is formed of, for example, an elastic body, such as a synthetic resin. The bush 59 covers the front end portion of the lower column 58, and fills a gap between the through-hole 111 and the outer wall of the lower column 58. Since the bush 59 is elastically deformable, the lower column 58 can oscillate about the front end portion thereof. That is, the steering column 5 can oscillate in a tilt direction within the elastic deformation range of the bush 59.

Meanwhile, the steering device 100 may not necessarily include the intermediate column 55. For example, the intermediate column 55 may be formed integrally with the outer column 54. That is, the outer column 54 may be formed to be long so as to compensate the length of the intermediate column 55. In this case, the lower column 58 is fitted to the front side of the outer column 54.

The steering device 100 includes an outer column bracket 52 that is fixed to a vehicle body-side member 13 and that supports the outer column 54. The outer column bracket 52 is made of, for example, a general steel material, such as a cold rolled steel sheet (SPCC material). The outer column bracket 52 includes a mounting plate portion 522 that is fixed to the vehicle body-side member 13 and frame-shaped support portions 521 that are formed integrally with the mounting plate portion 522. The mounting plate portion 522 of the outer column bracket 52 includes mounting holes 522h as illustrated in FIG. 4, and is fixed to the vehicle body-side member 13 using the mounting holes 522h and fixing members, such as bolts. The frame-shaped support portions 521 of the outer column bracket 52 are disposed on both sides of the outer column 54, and clamp the outer column 54. Further, each of the frame-shaped support portions 521 is provided with a tilt adjustment hole 521h that is an elongated hole long in the vertical direction of the vehicle body 10.

Figure 5:
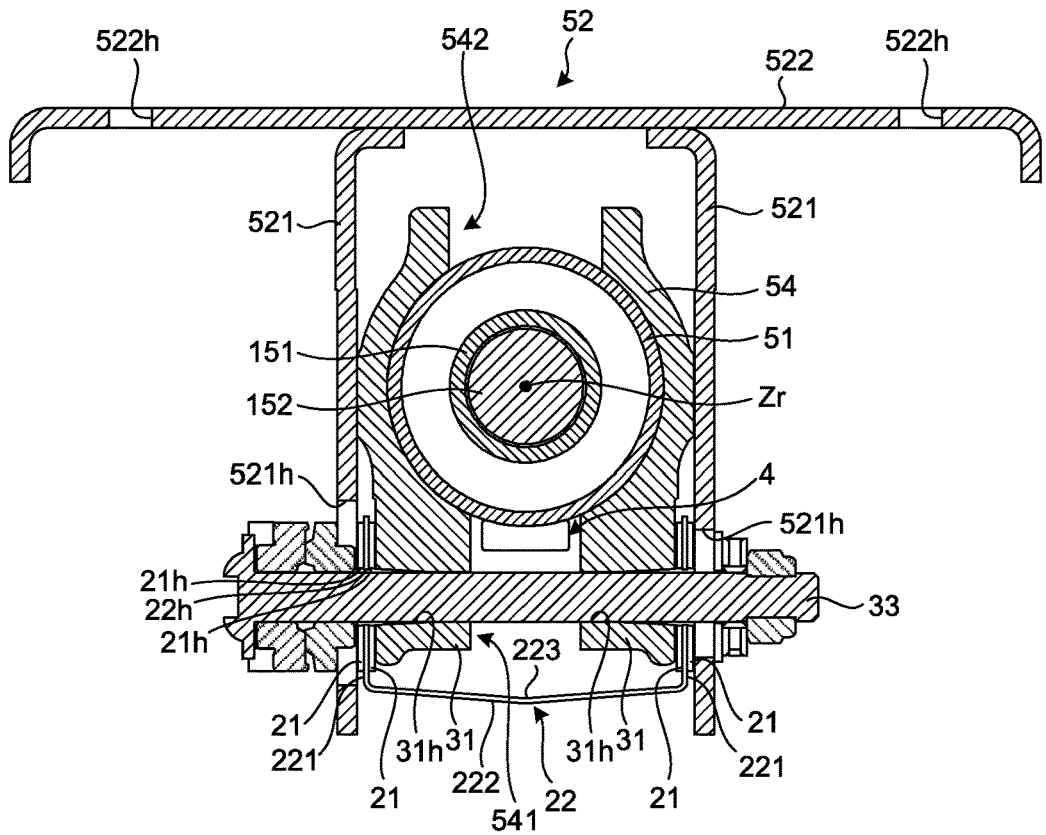
FIG. 5 is a cross-sectional view taken along line A-A of FIG. 2.

FIG. 5 is a cross-sectional view taken along line A-A of FIG. 2. As illustrated in FIG. 5, the outer column 54 includes two rod through-portions 31, a first slit 541, and a second slit 542. Each of the rod through-portion 31 is, for example, a member protruding downward from the outer wall of the inner column 51, and includes a rod through-hole 31h that is a round hole. The respective rod through-holes 31h included in the two rod through-portions 31 face each other with the first slit 541 interposed therebetween. Further, a part of the rod through-portions 31 face the frame-shaped support portions 521. A rod 33 passes through the two rod through-holes 31h, passes through the tilt adjustment holes 521h of the frame-shaped support portions 521, and is connected to an operation lever 53.

The first slit 541 is an elongated hole formed by notching one end of the outer column 54 and the one end is a side into which the inner column 51 is inserted. The first slit 541 is provided at a position between the two rod through-portions 31. Since the outer column 54 includes the first slit 541, the inner diameter of the outer column 54 is reduced when the outer column 54 is clamped. Accordingly, in a state in which the outer column 54 is clamped, the inner wall of the outer column 54 and the outer wall of the inner column 51 come into contact with each other at a portion where the outer column 54 covers the inner column 51. For this reason, a frictional force is generated between the outer column 54 and the inner column 51. For example, in this embodiment, the outer wall of the inner column 51 is coated with a low-friction material so that the friction between the inner column 51 and the outer column 54 is reduced.

As illustrated in FIG. 5, the steering device 100 includes first telescopic friction plates 21 and a second telescopic friction plate 22 as holding force-increasing members in order to increase a force for clamping and holding the steering column 5. For example, the first telescopic friction plates 21 and the second telescopic friction plate 22 are made of a general steel material, such as a cold rolled steel sheet (SPCC material). Each of the first telescopic friction plates 21 is a plate-like member including a telescopic adjustment hole 21h that is an elongated hole of which the longitudinal direction is parallel to the direction of the rotation axis Zr. For example, the first telescopic friction plates 21 are disposed on both sides of the outer column 54. More specifically, two first telescopic friction plates 21 are disposed at a position between each frame-shaped support portion 521 and each rod through-portion 31 so as to overlap each other. The second telescopic friction plate 22 is, for example, a member that is formed by bending a plate and has a substantially U shape when seen in the direction of the rotation axis Zr. The second telescopic friction plate 22 includes two friction portions 221 each of which is disposed between the two first telescopic friction plates 21, a connecting portion 222 that connects the two friction portions 221, and a bent portion 223 that is provided at the connecting portion 222.

Each of the friction portions 221 includes a rod through-hole 22h that is a round hole. The rod 33 passes through the telescopic adjustment holes 21h and the rod through-holes 22h. Since the connecting portion 222 connects the two friction portions 221 and is integrated with the two friction portions 221, it is easy to perform work for disposing each friction portion 221 between the two first telescopic friction plates 21. Further, since the connecting portion 222 includes the bent portion 223, a bent state can be maintained. Accordingly, even though the clamping state of the outer column bracket 52 is changed and a distance between the two friction portions 221 is changed, the friction portions 221 are not easily pulled by the connecting portion 222. For this reason, the friction portions 221 is pulled by the connecting portion 222, reducing a possibility that a gap may be generated between each friction portion 221 and each first telescopic friction plate 21.

Meanwhile, the first telescopic friction plates 21 may be not necessarily disposed at the position between the frame-shaped support portion 521 and the rod through-portion 31. For example, the first telescopic friction plates 21 may be disposed outside the frame-shaped support portion 521. That is, the first telescopic friction plates 21 may be disposed opposite to the rod through-portion 31 with the frame-shaped support portion 521 interposed therebetween.

Meanwhile, in this embodiment, the telescopic friction plates (the first telescopic friction plates 21 and the second telescopic friction plate 22) are used as the holding force-increasing members for increasing a force for clamping and holding the steering column 5. However, for example, publicly known means, such as a gear mesh type, may be used.

When the frame-shaped support portions 521 are clamped, the first telescopic friction plates 21 and the friction portions 221 of the second telescopic friction plate 22 are pressed against the rod through-portions 31 of the outer column 54 by the frame-shaped support portions 521. Accordingly, a frictional force is generated between each frame-shaped support portion 521 and each first telescopic friction plate 21, between each first telescopic friction plate 21 and each friction portion 221 of the second telescopic friction plate 22, and between each first telescopic friction plate 21 and each rod through-portion 31. For this reason, the area of a surface on which a frictional force is generated is increased in comparison with a case in which the first telescopic friction plates 21 and the second telescopic friction plate 22 are not provided. The frame-shaped support portions 521 can more firmly clamp the outer column 54 by the first telescopic friction plates 21 and the second telescopic friction plate 22.

When the operation lever 53 is rotated, a force for clamping the frame-shaped support portions 521 is reduced and a frictional force between the frame-shaped support portions 521 and the outer column 54 is removed or reduced. Accordingly, the tilt position of the outer column 54 can be adjusted. In this embodiment, the steering device 100 includes first springs 56 and a second spring 57 as illustrated in FIG. 2. Each of the first and second springs 56 and 57 is, for example, a coil spring. One end of each of the first springs 56 is mounted on the mounting plate portion 522, and the other end of each of the first springs 56 is mounted on the outer column 54. The first springs 56 assist the upward and downward movement of the steering column 5 during tilt adjustment and suppress the fall of the steering column 5. One end of the second spring 57 is mounted on the mounting plate portion 522, and the other end of the second spring 57 is mounted on the operation lever 53. The second spring 57 applies a preload to the rod 33 through the operation lever 53. Specifically, the second spring 57 applies a preload to the rod 33 in a direction crossing the longitudinal direction of the tilt adjustment hole 521h. Accordingly, the backlash of the rod 33 during tilt adjustment is suppressed.

Further, when the operation lever 53 is rotated, a force for clamping the frame-shaped support portions 521 is reduced and the width of the first slit 541 of the outer column 54 is increased. Accordingly, since a force for clamping the inner column 51 by the outer column 54 is removed, a frictional force during the slide of the inner column 51 is removed. Accordingly, an operator can adjust a telescopic position by pushing and pulling the inner column 51 through the steering wheel 14 after rotating the operation lever 53.

Figure 6:
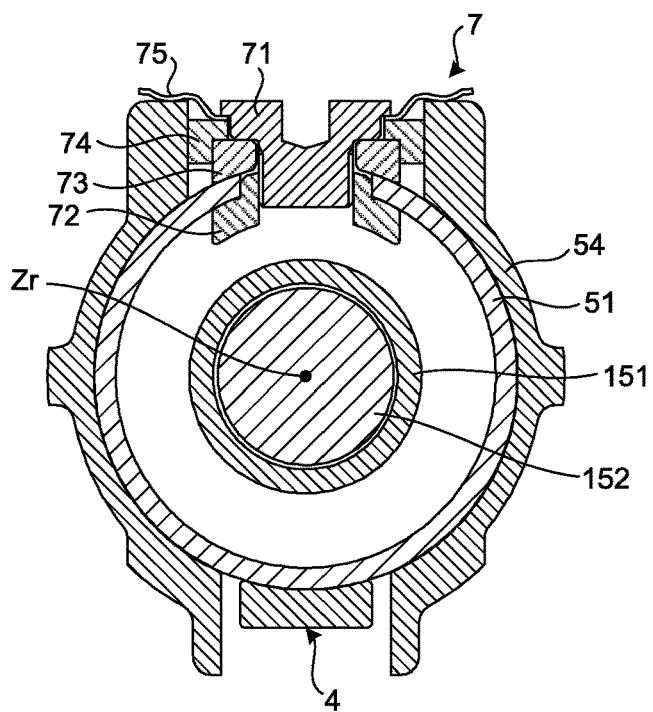
FIG. 6 is a cross-sectional view taken along line B-B of FIG. 2.
Figure 7:
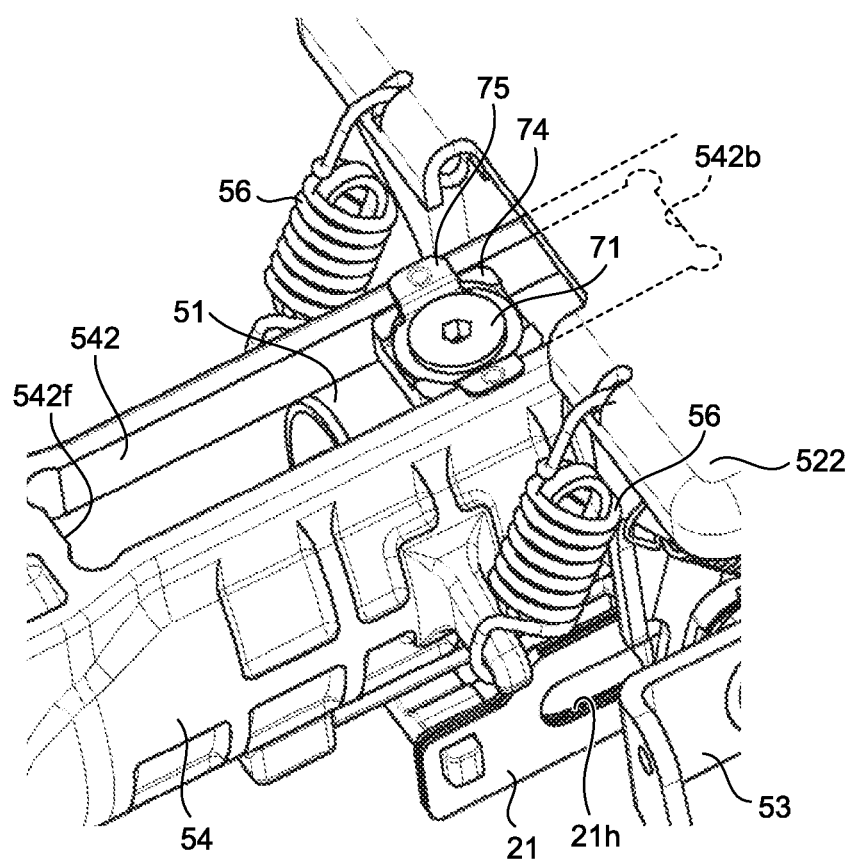
FIG. 7 is a perspective view of the periphery of a stopper according to this embodiment that is seen from the front side of a vehicle body.

FIG. 6 is a cross-sectional view taken along line B-B of FIG. 2. FIG. 7 is a perspective view of the periphery of a stopper according to this embodiment that is seen from the front side of the vehicle body. As illustrated in FIGS. 6 and 7, the steering device 100 includes a stopper 7. The stopper 7 is mounted on the inner column 51 at a position exposed to the second slit 542.

The stopper 7 includes, for example, a bolt 71, a contact plate 72, a washer 73, a spacer 74, and a conducting plate 75. The contact plate 72 is a plate-like metal member that includes a cylindrical protrusion. The cylindrical protrusion of the contact plate 72 is fitted to a through-hole, which is formed in the inner column 51 at a position exposed to the second slit 542, from the inside of the inner column 51. The contact plate 72 includes female threads on the inner wall of the cylindrical protrusion. The bolt 71 is fastened to the female threads of the contact plate 72. The washer 73 is disposed between the head of the bolt 71 and the contact plate 72. The bottom of the washer 73 is formed in a shape corresponding to the shape of the outer wall of the inner column 51. Accordingly, the posture of the bolt 71 is stable. The spacer 74 is a member that fills a gap between the inner wall of the second slit 542 and the bolt 71 and a gap between the inner wall of the second slit 542 and the contact plate 72. The spacer 74 is, for example, a member that includes a through-hole and is made of a resin. The bolt 71 and the contact plate 72 are disposed in the through-hole of the spacer 74. The conducting plate 75 is, for example, a plate-like metal member. For example, the conducting plate 75 is interposed and fixed between the head of the bolt 71 and the spacer 74 and is in contact with the outer column 54. Accordingly, the inner column 51 is electrically connected to the outer column 54 through the contact plate 72, the bolt 71, and the conducting plate 75. In this embodiment, current needs to flow toward the vehicle body 10 from the input shaft 151 in a case in which body earth is performed for a horn. However, since the input shaft 151 is connected to the output shaft 152 with a resin coating interposed therebetween, current does not flow to the output shaft 152 from the input shaft 151. Further, since the outer wall of the inner column 51 is coated with a low-friction material, current does not flow to the outer column 54 from the outer wall of the inner column 51. Accordingly, in this embodiment, the stopper 7 has a function to allow current, which is transmitted to the inner column 51 from the input shaft 151, to flow in the outer column 54.

Since the stopper 7 is mounted on the inner column 51, the stopper 7 can slide while facing the inner wall of the second slit 542 when telescopic adjustment is performed. Since the spacer 74 is made of a resin, the stopper 7 smoothly slides relative to the second slit 542. When the stopper 7 comes into contact with a third end portion-inner wall 542b that is the rear end portion of the second slit 542 during the adjustment of a telescopic position, the stopper 7 regulates the adjustment range of the telescopic position. Further, when the spacer 74 comes into contact with the inner wall of the second slit 542, the stopper 7 suppresses the rotation of the inner column 51 about the rotation axis Zr.

Figure 8:
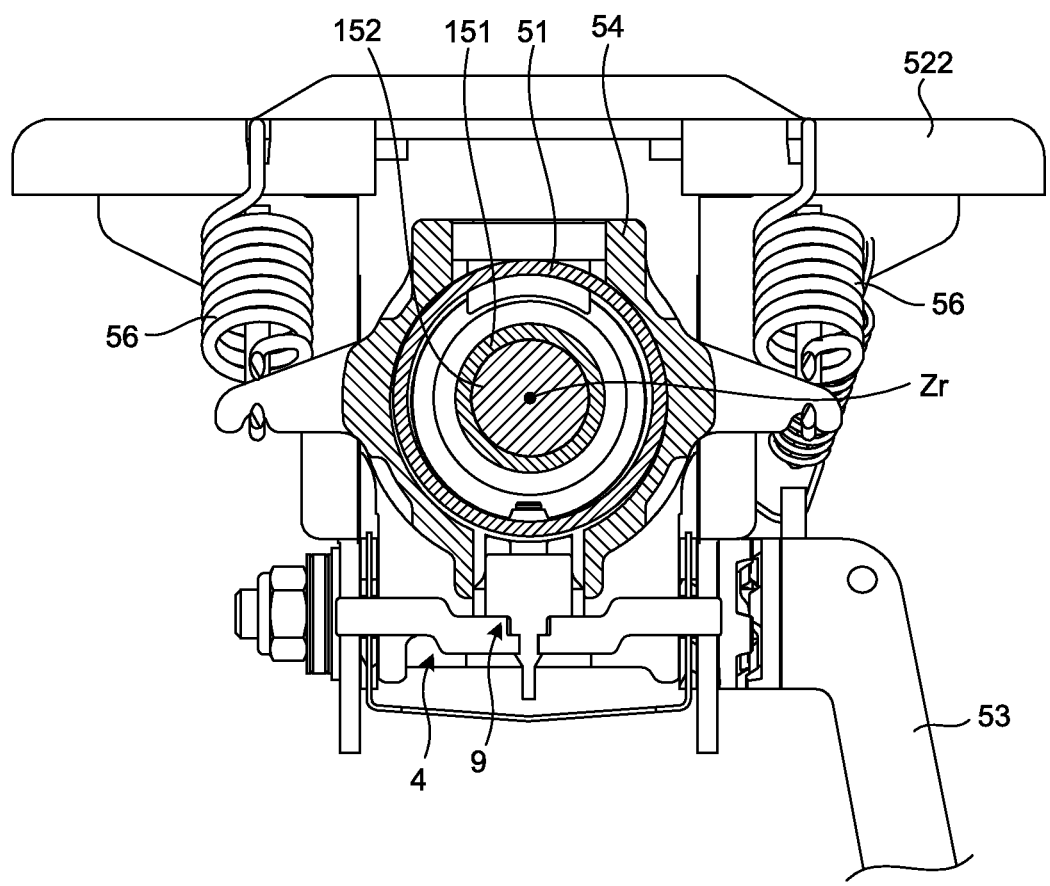
FIG. 8 is a cross-sectional view taken along line C-C of FIG. 2.
Figure 9:
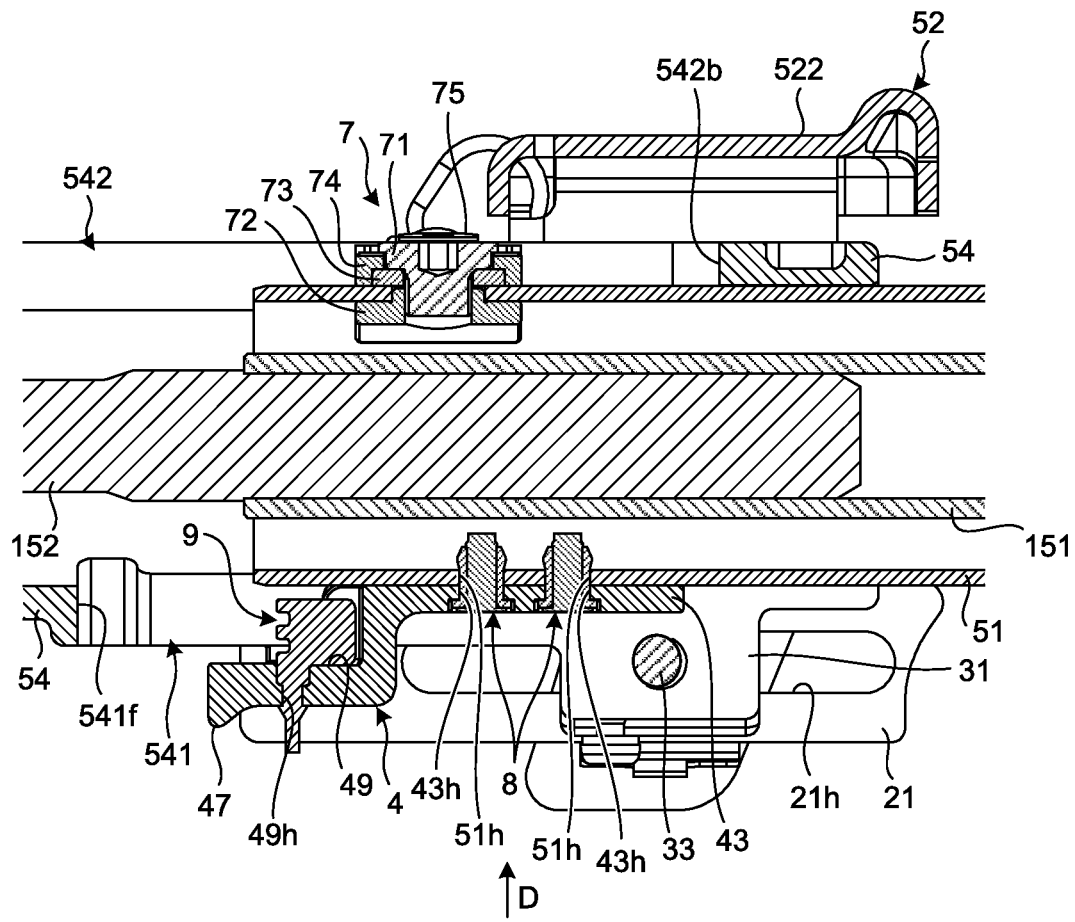
FIG. 9 is an enlarged view of the periphery of an inner column bracket of FIG. 3.
Figure 10:
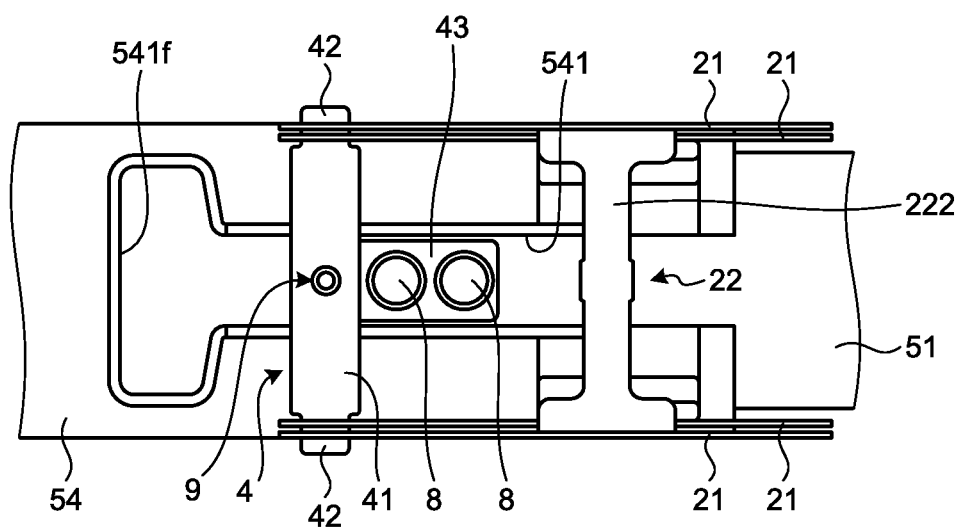
FIG. 10 is a view taken in the direction of an arrow D of FIG. 9.
Figure 11:
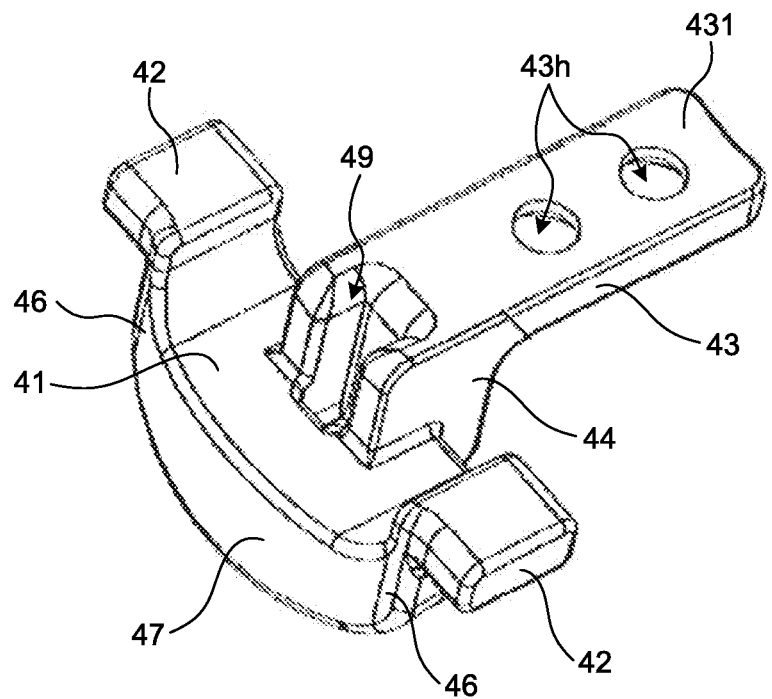
FIG. 11 is a perspective view of the inner column bracket according to this embodiment that is seen from the upper side of the vehicle body.
Figure 12:
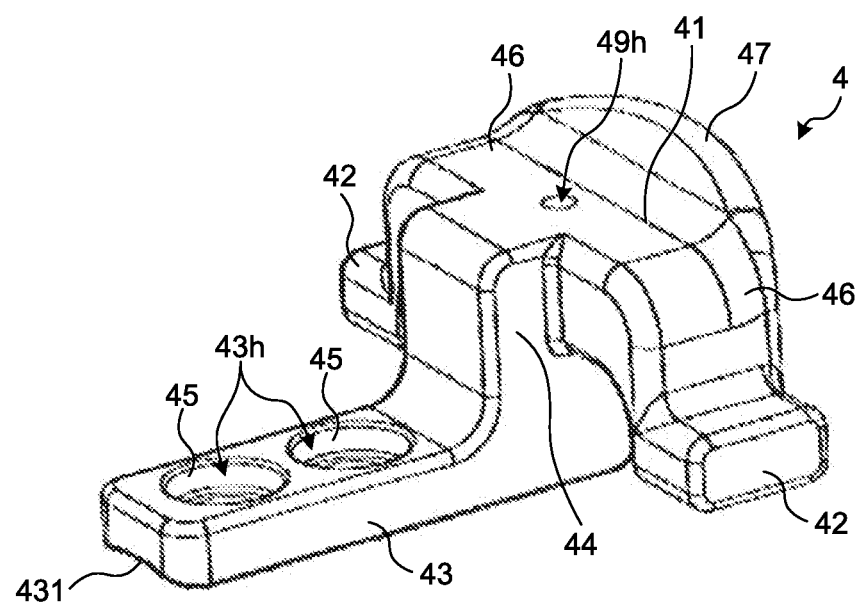
FIG. 12 is a perspective view of the inner column bracket according to this embodiment that is seen from the lower side of the vehicle body.

FIG. 8 is a cross-sectional view taken along line C-C of FIG. 2. FIG. 9 is an enlarged view of the periphery of an inner column bracket of FIG. 3. FIG. 10 is a view taken in the direction of an arrow D of FIG. 9. FIG. 11 is a perspective view of the inner column bracket according to this embodiment that is seen from the upper side of the vehicle body. FIG. 12 is a perspective view of the inner column bracket according to this embodiment that is seen from the lower side of the vehicle body. The steering device 100 includes an inner column bracket 4 that is made of, for example, metal, such as an aluminum alloy or a steel material.

As illustrated in FIG. 9, the inner column bracket 4 is disposed below, for example, the inner column 51. As illustrated in FIGS. 11 and 12, the inner column bracket 4 includes, for example, an arm portion 41, insertion portions 42, a neck portion 44, and a leg portion 43. As illustrated in FIG. 10, the arm portion 41 is a rod-like portion connecting two pairs of first telescopic friction plates 21 that are provided on both sides of the outer column 54 and face each other. The insertion portions 42 are portions that are provided at both ends of the arm portion 41 and are inserted into holes provided in the first telescopic friction plates 21. The insertion portions 42 are formed to be thinner than the arm portion 41. The neck portion 44 is a portion that protrudes from a part of the arm portion 41 in a direction orthogonal to the longitudinal direction of the arm portion 41. The leg portion 43 is a plate-like portion that is provided at an end portion of the neck portion 44 opposite to the arm portion 41, and is in contact with the inner column 51. As illustrated in FIG. 12, an inner column-side surface 431 of the leg portion 43 is formed in a shape corresponding to the shape of the outer wall of the inner column 51. The leg portion 43 includes two circular recesses 45 on the surface thereof opposite to the surface thereof facing the inner column 51, for example.

Further, the arm portion 41 includes curved portions 46 each of which is curved at a position between the neck portion 44 and the first telescopic friction plate 21 so as to approach the inner column 51. The arm portion 41 includes two curved portions 46, and the two curved portions 46 are disposed on both sides sandwiching the neck portion 44. Accordingly, the positions of the insertion portions 42 are close to the inner column 51 in comparison with a case in which the arm portion 41 does not include the curved portions 46. Further, the arm portion 41 includes a rib 47 that protrudes in a direction orthogonal to the axial direction of the inner column 51. For example, the rib 47 is formed to be long in a direction parallel to the longitudinal direction of the arm portion 41. Furthermore, as illustrated in FIG. 12, the rib 47 protrudes from the lower surface of the arm portion 41 and is disposed on the front end portion of the arm portion 41. Since the arm portion 41 is provided with the rib 47, the stiffness of the arm portion 41 is improved.

Further, the inner column bracket 4 includes a notched portion 49 and a through-hole 49h as illustrated in FIG. 9. The notched portion 49 is a notch that is formed on the surface facing the inner column 51 at the front end portion of the inner column bracket 4. The through-hole 49h passes through the arm portion 41 in the radial direction of the inner column 51. A damper 9 is disposed in the notched portion 49.

As illustrated in FIG. 10, the inner column bracket 4 is connected to the first telescopic friction plates 21 that are disposed on both sides of the outer column 54. The insertion portions 42 are inserted into the holes provided in the first telescopic friction plates 21, so that the inner column bracket 4 is supported by the first telescopic friction plates 21. Further, the first telescopic friction plates 21, which are disposed on both sides of the outer column 54, face each other with the arm portion 41 of the inner column bracket 4 interposed therebetween. Furthermore, the inner column bracket 4 is connected to the inner column 51 by the leg portion 43.

In order to detachably connect the inner column bracket 4 to the inner column 51, first holes 51h are formed in the inner column 51 and second holes 43h are formed in the bottoms of the recesses 45 of the leg portion 43 as illustrated in FIG. 9. The first holes 51h and the second holes 43h communicate with each other. For example, in this embodiment, two first holes 51h and two second holes 43h are formed and the first and second holes 51h and 43h have the same inner periphery. When shear pins 8 are inserted at positions across the first and second holes 51h and 43h, the inner column bracket 4 and the inner column 51 are detachably connected to each other. Further, the first and second holes 51h and 43h are disposed at positions from which distances to the first telescopic friction plates 21 disposed on both sides of the outer column 54 are equal to each other.

Furthermore, the inner column bracket 4 is disposed so that at least a part of the inner column bracket 4 is fitted to the first slit 541 of the outer column 54. Specifically, the leg portion 43 of the inner column bracket 4 is fitted to the first slit 541 so as to face the inner wall of the first slit 541.

Since the inner column bracket 4 is mounted on the inner column 51, the inner column bracket 4 can slide while facing the inner wall of the first slit 541 when telescopic adjustment is performed. When the inner column bracket 4 comes into contact with a first end portion-inner wall 541f that is the inner wall of the front end portion of the first slit 541 during the adjustment of a telescopic position, the inner column bracket 4 regulates the adjustment range of the telescopic position. Further, as illustrated in FIG. 3, a distance between the stopper 7 and a second end portion-inner wall 542f, which is formed on the front side of the second slit 542, is longer than a distance between the inner column bracket 4 and the first end portion-inner wall 541f. Accordingly, after the inner column bracket 4 is detached from the inner column 51, the moving distance (stroke) of the inner column bracket 4 to the front side of the inner column 51 is ensured by a predetermined distance or more. Accordingly, in this embodiment, the front limit of the telescopic position is regulated by the inner column bracket 4 and the first end portion-inner wall 541f and the rear limit of the telescopic position is regulated by the stopper 7 and the third end portion-inner wall 542b.

Figure 13:
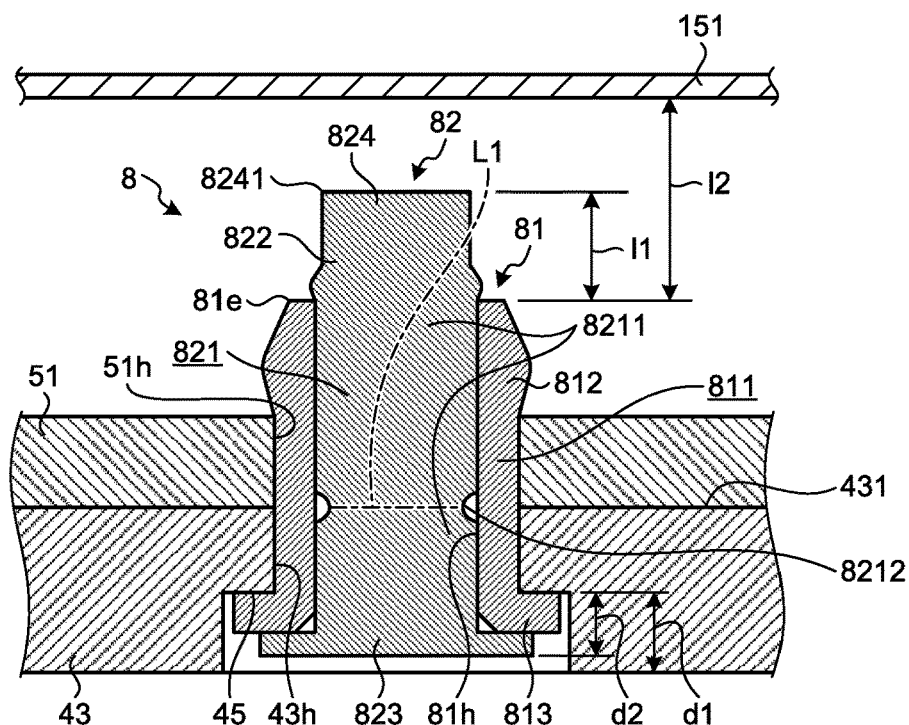
FIG. 13 is an enlarged view of the periphery of a shear pin of FIG. 9.
Figure 14:
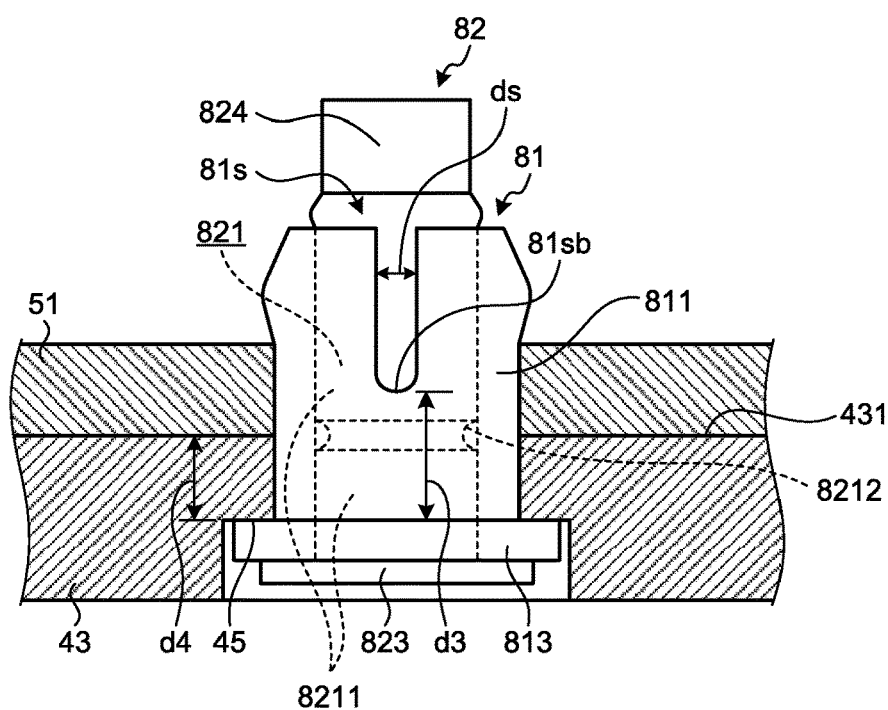
FIG. 14 is a side view of only the shear pin of FIG. 13.

FIG. 13 is an enlarged view of the periphery of the shear pin of FIG. 9. FIG. 14 is a side view of only the shear pin of FIG. 13. In this embodiment, each of the shear pins 8 includes an outer pin 81 and an inner pin 82. The outer pin 81 and the inner pin 82 are made of, for example, a resin, such as polyacetal.

As illustrated in FIG. 13, the outer pin 81 is a cylindrical member that passes through the first and second holes 51h and 43h. The outer pin 81 includes, for example, a body portion 811, a retaining portion 812, an outer flange portion 813, and a guide hole 81h. The body portion 811 has a cylindrical shape, and passes through the first and second holes 51h and 43h. The retaining portion 812 is provided at one end of the body portion 811, and is positioned inside the inner column 51. The retaining portion 812 has a cylindrical shape, and has an outer periphery that is larger than the inner periphery of the first hole 51h and the inner periphery of the second hole 43h. Accordingly, since the retaining portion 812 is in contact with the inner wall of the inner column 51, the outer pin 81 does not easily fall off from the first and second holes 51h and 43h. The outer flange portion 813 is provided at the other end of the body portion 811, and is positioned outside the second hole 43h in the radial direction of the inner column 51. The outer flange portion 813 has the shape of, for example, a disc, and has an outer periphery that is larger than the inner periphery of the first hole 51h and the inner periphery of the second hole 43h. Accordingly, since the outer flange portion 813 is in contact with the bottom of the recess 45, the outer pin 81 does not easily fall off from the first and second holes 51h and 43h. The guide hole 81h is a through-hole that passes through the retaining portion 812 from the outer flange portion 813.

In this embodiment, the outer pin 81 is inserted into the first and second holes 51h and 43h by press-fitting. When the outer pin 81 is inserted into the first and second holes 51h and 43h, the first and second holes 51h and 43h are positioned. For example, the retaining portion 812 is inserted into the first and second holes 51h and 43h from the second hole 43h side. The outer periphery of an end portion 81e of the retaining portion 812 opposite to the body portion 811 is formed to be smaller than the inner periphery of the first hole 51h and the inner periphery of the second hole 43h. Accordingly, the retaining portion 812 is easily inserted into the second hole 43h.

Meanwhile, the outer pin 81 may be inserted into the first and second holes 51h and 43h from the first holes 51h side. Further, the outer pin 81 may be press-fitted after ribs or the like are provided on the outer wall of the body portion 811.

As illustrated in FIG. 14, the outer pin 81 includes one notch 81s that is formed toward the outer flange portion 813 from the retaining portion 812. Since the width ds of the notch 81s in the circumferential direction of the outer pin 81 is reduced when the retaining portion 812 is inserted into the second hole 43h, the outer periphery of the retaining portion 812 becomes small. Accordingly, the retaining portion 812 easily passes through the first and second holes 51h and 43h. In the following description, the width ds of the notch 81s in the circumferential direction of the outer pin 81 is simply described as the width ds of the notch 81s.

Meanwhile, the outer pin 81 may include a plurality of notches 81s. In a case in which the plurality of notches 81s are provided, it is preferable that the plurality of notches 81s are arranged at regular intervals in the circumferential direction of the outer pin 81.

In a state in which the outer pin 81 has not yet passed through the first and second holes 51h and 43h, the outer periphery of the body portion 811 is larger than the inner periphery of the first hole 51h and the inner periphery of the second hole 43h. Further, since the body portion 811 is elastically deformed in a state in which the outer pin 81 passes through the first and second holes 51h and 43h, the outer periphery of the body portion 811 becomes equal to the inner periphery of the first hole 51h and the inner periphery of the second hole 43h. Accordingly, the body portion 811 pushes the inner wall of the first hole 51h and the inner wall of the second hole 43h. For this reason, a gap between the body portion 811 and the inner wall of the first hole 51h and a gap between the body portion 811 and the inner wall of the second hole 43h are not easily formed. Accordingly, the backlash of the outer pin 81 is suppressed.

The inner pin 82 is a member that is inserted into the guide hole 81h of the outer pin 81. The inner pin 82 includes, for example, a trunk portion 821, a protruding portion 822, an inner flange portion 823, and a guide portion 824.

The trunk portion 821 has a columnar shape and passes through the guide hole 81h. The trunk portion 821 includes a large-diameter portion 8211 and a small-diameter portion 8212. The large-diameter portion 8211 has, for example, a columnar shape and has an outer periphery that is equal to the inner periphery of the guide hole 81h. The small-diameter portion 8212 is inserted at a position across the first and second holes 51h and 43h. The small-diameter portion 8212 has the shape of, for example, a rotating body concentric with the large-diameter portion 8211. The outer periphery of the small-diameter portion 8212 is smaller than the outer periphery of the large-diameter portion 8211. The small-diameter portion 8212 is formed by notching, for example, a part of the trunk portion 821 over the entire circumference in the circumferential direction. That is, the small-diameter portion 8212 is a groove that makes the surface of the trunk portion 821 be recessed along the circumferential direction. For example, the bottom portion of the surface of the small-diameter portion 8212 is formed in the shape of a curved surface. That is, the surface of the small-diameter portion 8212 draws an arc in the cross-section (the cross-section illustrated in FIG. 13) of the inner pin 82 taken along a plane including the rotation axis Zr. More specifically, the surface of the small-diameter portion 8212 draws a semicircle. For example, in the cross-section illustrated in FIG. 13, a straight line L1 passing through a portion of the small-diameter portion 8212 where the outer periphery is minimum is positioned on the extended line of the outer wall of the inner column 51, that is, on the extended line of the inner column-side surface 431 of the leg portion 43.

The protruding portion 822 is provided at an end portion of the trunk portion 821 that is positioned inside the inner column 51. That is, the protruding portion 822 is disposed at a position that is present inside the inner column 51 and outside the guide hole 81h. The protruding portion 822 has an outer periphery that is larger than the inner periphery of the guide hole 81h. Accordingly, since the protruding portion 822 is in contact with one end edge of the guide hole 81h, the inner pin 82 does not easily fall off from the outer pin 81.

The inner flange portion 823 has the shape of, for example, a disc concentric with the trunk portion 821, and is provided at an end portion of the trunk portion 821 opposite to the protruding portion 822. The inner flange portion 823 is disposed at a position that is present inside the recess 45 and outside the guide hole 81h. The outer periphery of the inner flange portion 823 is larger than the inner periphery of the guide hole 81h. Accordingly, since the inner flange portion 823 is in contact with the other end edge of the guide hole 81h, the inner pin 82 does not easily fall off from the outer pin 81.

The guide portion 824 has the shape of, for example, a column concentric with the trunk portion 821 and is provided at an end portion of the protruding portion 822 opposite to the trunk portion 821. That is, the protruding portion 822 is disposed between the trunk portion 821 and the guide portion 824. The outer periphery of the guide portion 824 is smaller than the outer periphery of the trunk portion 821. Further, as illustrated in FIG. 13, a distance l1 between the end portion 81e of the outer pin 81 and an end of the guide portion 824 is shorter than a distance l2 between the end portion 81e and the input shaft 151.

Meanwhile, the guide hole 81h may include a stepped portion in which the inner periphery is enlarged at an end portion thereof. In this case, since the protruding portion 822 is in contact with an edge of the stepped portion, the inner pin 82 does not easily protrude from the end portion of the guide hole 81h.

In this embodiment, the inner pin 82 is inserted into the guide hole 81h from the guide portion 824 thereof. First, the guide portion 824 is inserted into the guide hole 81h from the outer flange portion 813. Since the outer periphery of the guide portion 824 is smaller than the outer periphery of the trunk portion 821, a gap is formed between the guide portion 824 and the inner wall of the guide hole 81h. Accordingly, the guide portion 824 can easily enter the guide hole 81h. After that, for example, after the protruding portion 822 comes into contact with the edge of the guide hole 81h, pressure is applied to the inner pin 82. Accordingly, the inner pin 82 is pressed into the guide hole 81h. That is, the inner pin 82 is press-fitted to the guide hole 81h. The inner pin 82 is pressed into the guide hole 81h in a state in which the guide portion 824 is inserted into the guide hole 81h in advance.

There is a possibility that the central axis of the inner pin 82 may be inclined with respect to the central axis of the guide hole 81h when the inner pin 82 is pressed into the guide hole 81h. That is, there is a possibility that the inner pin 82 may fall down. However, even if the inner pin 82 falls down, an edge 8241 of the guide portion 824 comes into contact with the inner wall of the guide hole 81h in this embodiment. Accordingly, an angle between the central axis of the inner pin 82 and the central axis of the guide hole 81h, that is, the tilt angle of the inner pin 82 is regulated to a predetermined angle or less. Therefore, the posture of the inner pin 82 when being pressed into the guide hole 81h is easily made to be stable.

Meanwhile, it is preferable that the edge 8241 of the guide portion 824 is subjected to chamfering. The chamfering may be chamfering (C chamfering) in which an object is cut to have a linear cross-sectional shape, and may be chamfering (R chamfering) in which an object is cut to have a curved cross-sectional shape. Accordingly, when the inner pin 82 is inserted into the guide hole 81h, the guide portion 824 easily enters the guide hole 81h.

In a state in which the inner pin 82 has not yet been inserted into the guide hole 81h, the outer periphery of the large-diameter portion 8211 is larger than the inner periphery of the guide hole 81h. Further, since the large-diameter portion 8211 is elastically deformed in a state in which the trunk portion 821 passes through the guide hole 81h, the outer periphery of the large-diameter portion 8211 becomes equal to the inner periphery of the guide hole 81h. Accordingly, the large-diameter portion 8211 pushes the inner wall of the guide hole 81h to the outside in the radial direction. For this reason, a gap between the trunk portion 821 and the inner wall of the guide hole 81h is not easily formed. Accordingly, the backlash of the inner pin 82 is suppressed.

When the large-diameter portion 8211 pushes the inner wall of the guide hole 81h to the outside in the radial direction, a force for increasing the width ds of the notch 81s acts on the outer pin 81. Accordingly, a frictional force, which is generated between the outer pin 81 and the inner wall of the first hole 51h and between the outer pin 81 and the inner wall of the second hole 43h, is increased. Further, since the width ds of the notch 81s at the retaining portion 812 is increased, the outer periphery of the retaining portion 812 is increased. For this reason, the shear pin 8, which includes the outer pin 81 and the inner pin 82 integrated with each other, is fixed at a position across the first and second holes 51h and 43h and connects the inner column bracket 4 to the inner column 51.

Since the inner pins 82 are inserted to assemble the steering device 100 after the first and second holes 51h and 43h are positioned by the outer pins 81, the steering device 100 can be easily assembled.

Further, since the distance l1 is shorter than the distance l2 as illustrated in FIG. 13, the guide portion 824 of the inner pin 82 does not easily come into contact with the input shaft 151. Accordingly, an increase in the rotational resistance of the input shaft 151, which is caused by the contact between the input shaft 151 and the guide portion 824, is suppressed.

Furthermore, since the shear pins 8 are used for the first and second holes 51h and 43h, a device for filling the holes with resin members and members receiving the resin members are not required in the steering device 100 according to this embodiment in comparison with a case in which the first and second holes 51h and 43h are filled with the resin members. For this reason, the steering device 100 according to this embodiment can be easily assembled.

Meanwhile, it is preferable that the depth d1 of the recess 45 is equal to or larger than the length d2 of a portion of the shear pin 8 protruding from the second hole 43h as illustrated in FIG. 13. Accordingly, the shear pin 8 does not protrude from the surface of the inner column bracket 4. For this reason, a possibility that the shear pin 8 may be damaged by an external force is reduced.

When a collision load is applied to the steering wheel 14, the collision load is transmitted to the inner column 51 through the input shaft 151 and moves the inner column 51 to the front side. On the other hand, the inner column bracket 4 supported by the first telescopic friction plates 21 does not move. For this reason, since a shear force is applied to the shear pins 8, the shear pins 8 are cut in a case in which the collision load exceeds the allowable shear force of the shear pins 8. When the shear pins 8 are cut, the connection between the inner column 51 and the inner column bracket 4 is released. When the connection between the inner column 51 and the inner column bracket 4 is released, the inner column 51 is supported in the axial direction by a frictional force that is generated between the inner column 51 and the outer column 54. Accordingly, when an operator collides with the steering wheel 14 and a collision load is applied to the steering wheel 14, a force for moving the inner column 51 immediately after the application of the collision load is reduced and an impact is absorbed.

Further, even though the shear pins 8 are cut, the outer column 54 continues to be supported by the outer column bracket 52 fixed to the vehicle body-side member 13. Furthermore, the inner column 51 continues to be supported by the outer column 54. For this reason, even though the shear pins 8 are cut, the steering column 5 does not fall.

Figure 15:
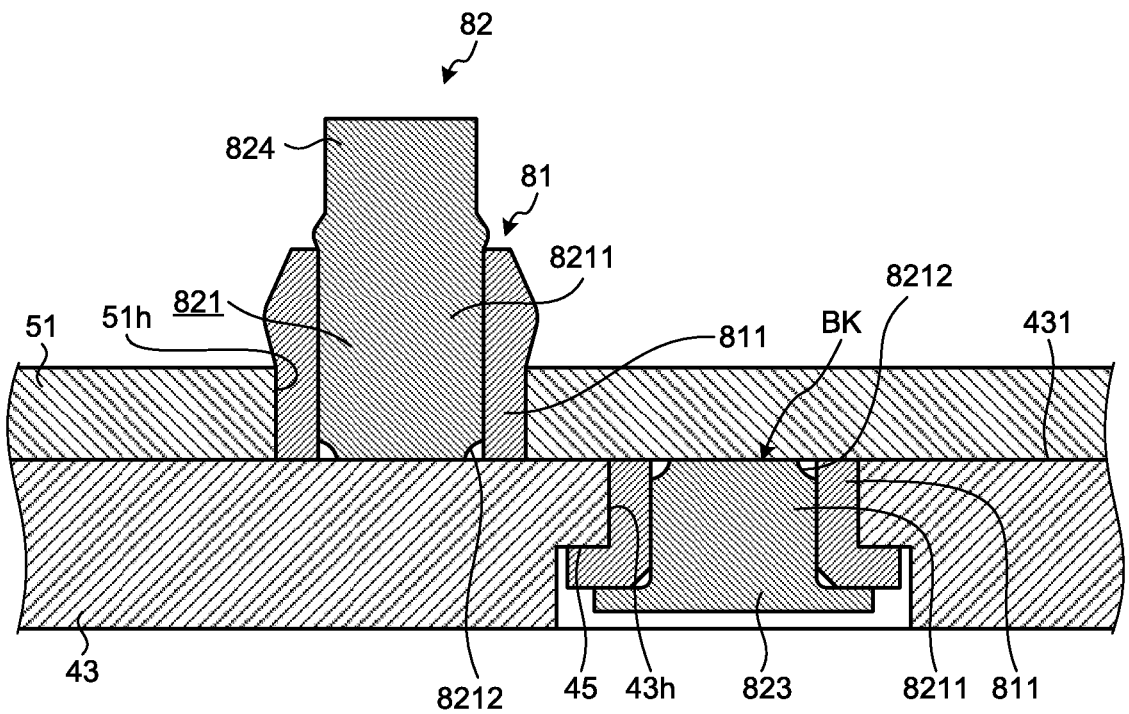
FIG. 15 is a diagram illustrating the state of a cut shear pin.

FIG. 15 is a diagram illustrating the state of the shear pin that has been cut. As illustrated in FIG. 15, the shear pin 8 is cut at a cut surface BK. The cut surface BK is formed at a portion of the shear pin 8 across the first and second holes 51h and 43h. In the cross-section illustrated in FIG. 15, the cut surface BK is positioned on the extended line of the outer wall of the inner column 51, that is, on the extended line of the inner column-side surface 431 of the leg portion 43.

The allowable shear force of the shear pins 8 depends on the area of the cut surface BK. Since the outer periphery of the small-diameter portion 8212 is smaller than the outer periphery of the large-diameter portion 8211, stress concentration occurs and cracks are easily generated at the small-diameter portion 8212 when a shear force is applied to the inner pin 82. Accordingly, the inner pin 82 is easily cut at the small-diameter portion 8212. That is, the cut surface BK of the inner pin 82 is easily present within the small-diameter portion 8212. For this reason, the area of the cut surface BK of the inner pin 82 does not easily vary. Therefore, the allowable shear force of the shear pins 8 is stable.

Further, since the bottom portion of the surface of the small-diameter portion 8212 is formed in the shape of a curved surface as described above, machining is easier than in a case in which the bottom portion of the surface of the small-diameter portion 8212 is formed in a pointed shape. For this reason, the small-diameter portion 8212 according to this embodiment allows machining accuracy to be improved.

Furthermore, it is preferable that a distance d3 between the outer flange portion 813 and an end 81sb of the notch 81s is longer than a distance d4 between the outer flange portion 813 and the outer wall of the inner column 51 as illustrated in FIG. 14. Accordingly, when the shear pin 8 is cut, the notch 81s is not included on the cut surface BK. For this reason, since an absent portion corresponding to the notch 81s is not present in the cross-section of the body portion 811 at the cut surface BK, the variation of the allowable shear force of the shear pins 8 is suppressed.

Further, it is preferable that the inner column 51 moves straight in the axial direction after the shear pin 8 is cut. The reason for this is that a possibility that the movement of the inner column 51 may be obstructed or a possibility that a frictional force generated between the inner column 51 and the outer column 54 may become larger than a predetermined value is increased in a case in which an angle is formed between the moving direction of the inner column 51 and the axial direction of the outer column 54.

In this embodiment, the inner column bracket 4 is joined to the first telescopic friction plates 21 disposed on both sides of the outer column 54 as illustrated in FIG. 10. Accordingly, when a load in the axial direction is applied to the inner column bracket 4, the inner column bracket 4 receives clamping forces from both sides of the outer column 54. For this reason, the posture of the inner column bracket 4, when the shear pins 8 are cut, is stable. Accordingly, the posture of the inner column 51, when the inner column 51 starts to move, is easily kept straight in the axial direction. Therefore, the inner column 51 easily moves straight in the axial direction.

Further, as illustrated in FIG. 9, each of two first holes 51h and two second holes 43h are formed at positions different from each other in the axial direction. For this reason, two shear pins 8 are disposed at positions different from each other in the axial direction. If one first hole 51h and one second hole 43h are formed, that is, if one shear pin 8 is disposed, there is a possibility that the inner column bracket 4 may rotate about the shear pin 8. In contrast, since the shear pins 8 are disposed at positions different from each other in the axial direction in this embodiment, the rotation of the inner column bracket 4 is suppressed. For this reason, the posture of the inner column bracket 4, when the shear pins 8 are cut, is more stable.

Furthermore, the first and second holes 51h and 43h are disposed at positions from which distances to the first telescopic friction plates 21, which are disposed on both sides of the inner column bracket 4 so as to face each other with the inner column bracket 4 interposed therebetween, are equal to each other. Accordingly, since the inner column bracket 4 more equally receives clamping forces from both sides of the outer column 54 when a load in the axial direction is applied to the inner column bracket 4, the posture of the inner column bracket 4, when the shear pins 8 are cut, is more stable. Therefore, the posture of the inner column 51, when the inner column 51 starts to move, is easily kept straighter in the axial direction. As a result, the inner column 51 easily moves straighter in the axial direction.

Moreover, since the stopper 7 is fitted to the second slit 542 even if the inner column bracket 4 cannot equally receive clamping forces from both sides of the outer column 54, the inner column 51 is guided in the longitudinal direction of the second slit 542, that is, in the axial direction. For this reason, the posture of the inner column bracket 4, when the shear pins 8 are cut, is stable.

Meanwhile, the allowable shear force of the shear pins 8 can be adjusted by the change of the number of each of the first and second holes 51h and 43h, the cross-sectional area of each of the first and second holes 51h and 43h, and the material of the shear pins 8. For example, the number of each of the first and second holes 51h and 43h may be one and may be three or more. Further, the shear pins 8 may be made of, for example, metal including non-ferrous metal, rubber, or the like.

Meanwhile, each of the shear pins 8 may be not necessarily formed of the above-mentioned outer pin 81 and the above-mentioned inner pin 82. For example, the shear pins 8 may be formed by the solidification of a resin that is filled at positions across the first and second holes 51h and 43h, or the like.

Figure 16:
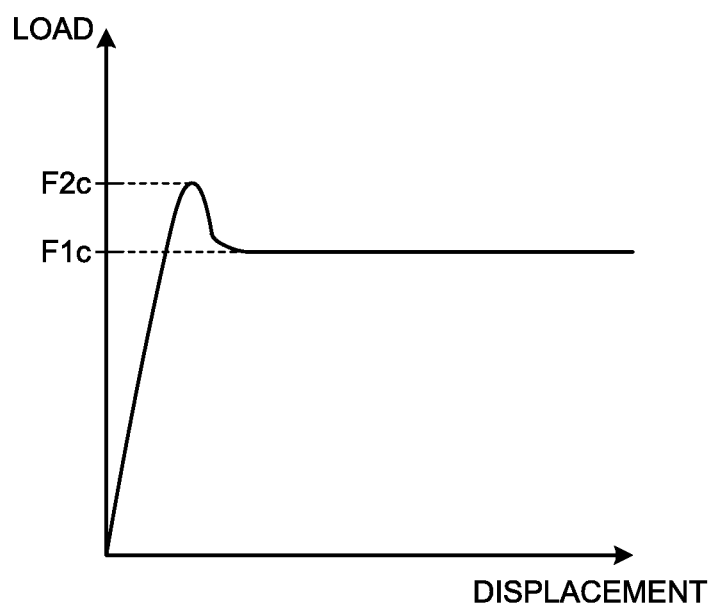
FIG. 16 is a graph illustrating a relationship between the displacement of a steering column and a load required to move the steering column, in a comparative example.
Figure 17:
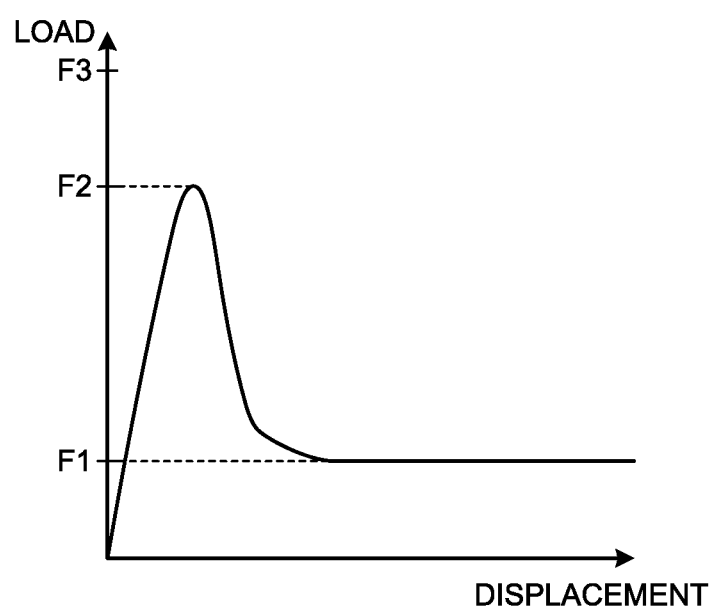
FIG. 17 is a graph illustrating a relationship between the displacement of a steering column and a load required to move the steering column, in this embodiment.

FIG. 16 is a graph illustrating a relationship between the displacement of a steering column and a load required to move the steering column, in a comparative example. FIG. 17 is a graph illustrating a relationship between the displacement of the steering column and a load required to move the steering column, in this embodiment. In FIGS. 16 and 17, a horizontal axis represents the displacement of the steering column to the front side and a vertical axis represents a load that is required to move the steering column to the front side.

A comparative example is an example in a case in which an outer column is detachably mounted on a vehicle body as in the technique disclosed in Patent Literature 1. Since the outer column is disposed on the rear side of an inner column in the comparative example, a rod comes into contact with an end portion of a telescopic adjustment hole provided at the outer column when a collision load is applied to the outer column. Accordingly, a load is transmitted to a capsule that is a member joining a bracket to a vehicle body-side member. A force F2c illustrated in FIG. 16 represents the allowable shear force of the capsule.

In the comparative example, the outer column is supported in the axial direction by a frictional force that is generated between the outer column and the inner column by the clamping of a bracket. A force F1c illustrated in FIG. 16 represents the frictional force that supports the outer column. The force F1c is smaller than the force F2c. The force F1c needs to be maintained at a predetermined value or more so that the outer column is not moved by a load applied during ordinary use.

When a load equal to or larger than the force F2c is applied to the outer column in the comparative example, the capsule is cut and the outer column is detached from the vehicle body. After that, the outer column moves in the axial direction while absorbing an impact by the frictional force between the inner column and the outer column. However, since the force F1c is maintained at a predetermined value or more as described above, it is difficult to more easily protect an operator from a secondary collision by making the movement of the outer column smooth.

On the other hand, in this embodiment, the inner column 51 is supported in the axial direction by a first frictional force that is generated between the outer column 54 and the inner column 51 by the clamping of the outer column bracket 52, and a second frictional force that is generated between the first telescopic friction plates 21 and the members (the outer column bracket 52, the second telescopic friction plate 22, and the outer column 54) being in contact with the first telescopic friction plates 21. A force F1 illustrated in FIG. 17 represents the first frictional force, and a force F3 represents the sum of the first frictional force and the second frictional force. Further, a force F2 illustrated in FIG. 17 represents the allowable shear force of the shear pins 8. The force F2 is smaller than the force F3 and is larger than the force F1.

When a load equal to or larger than the force F2 is applied to the inner column 51 in this embodiment, the shear pins 8 are cut and the inner column 51 is detached from the inner column bracket 4. Accordingly, since the connection between the inner column 51 and the first telescopic friction plates 21 is released, the above-mentioned second frictional force does not act on the inner column 51. For this reason, after the shear pins 8 are cut, the inner column 51 moves in the axial direction while absorbing an impact by the above-mentioned first frictional force. When the first frictional force is set to be small, the steering device 100 according to this embodiment allows an operator to be easily protected from a secondary collision by making the movement of the inner column 51 smooth.

A reduction in the first frictional force of the forces for supporting the inner column 51 in the axial direction can be compensated by the second frictional force in this embodiment even if the setting value of the first frictional force is set to be small. For this reason, the steering device 100 according to this embodiment can suppress the movement of the inner column 51, which is caused by a load applied during ordinary use, and allows an operator to be easily protected from a secondary collision by adjusting the setting value of the first frictional force and the setting value of the second frictional force.

Incidentally, in a case in which telescopic adjustment is performed after the operation of the operation lever 53 during ordinary use, a shear force acts on the shear pins 8 when the inner column bracket 4 comes into contact with the first end portion-inner wall 541f. For this reason, in a case in which a force to be applied to the inner column 51 during the telescopic adjustment is too large, there is a possibility that the shear pins 8 may be cut due to the telescopic adjustment. Accordingly, the steering device 100 according to this embodiment includes the damper 9 as described above. The damper 9 is made of, for example, a synthetic rubber and is mounted on the front end portion of the inner column bracket 4 as illustrated in FIG. 9. More specifically, the damper 9 passes through the through-hole 49h of the inner column bracket 4 and is fixed to the inner column bracket 4.

In a case in which the telescopic adjustment is performed after the operation of the operation lever 53, the damper 9 comes into contact with the first end portion-inner wall 541f when the telescopic position is present on the front-most side. When a force is applied to the inner column 51 in a state in which the damper 9 is in contact with the first end portion-inner wall 541f, a reaction force from the first end portion-inner wall 541f is applied to the damper 9. Accordingly, since the damper 9 is elastically deformed, a part of the force applied to the damper 9 is consumed to elastically deform the damper 9. Therefore, a force smaller than the force applied to the damper 9 is transmitted to the inner column bracket 4 and a shear force having substantially the same magnitude as the magnitude of the force transmitted to the inner column bracket 4 acts on the shear pins 8. For this reason, the shear force acting on the shear pins 8 is smaller than the force applied to the inner column 51. Accordingly, the steering device 100 according to this embodiment can protect a detachment mechanism by suppressing the cutting of the shear pins 8 when the telescopic adjustment is performed.

Figure 18:
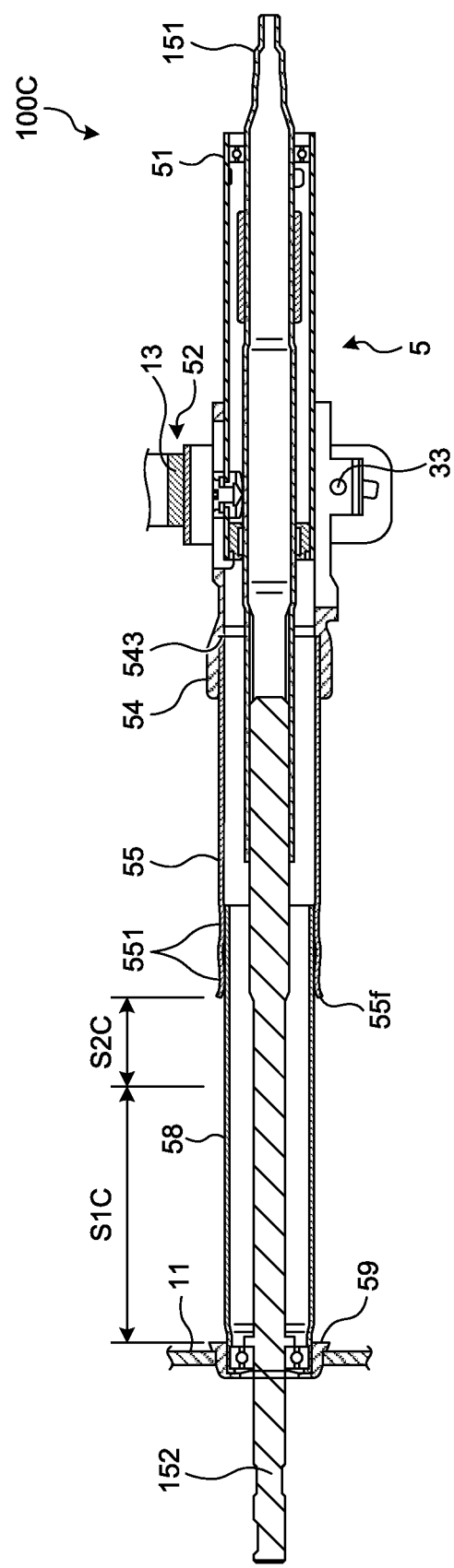
FIG. 18 is a cross-sectional view illustrating the state of a steering device according to a comparative example that has not yet been subjected to a collision.
Figure 19:
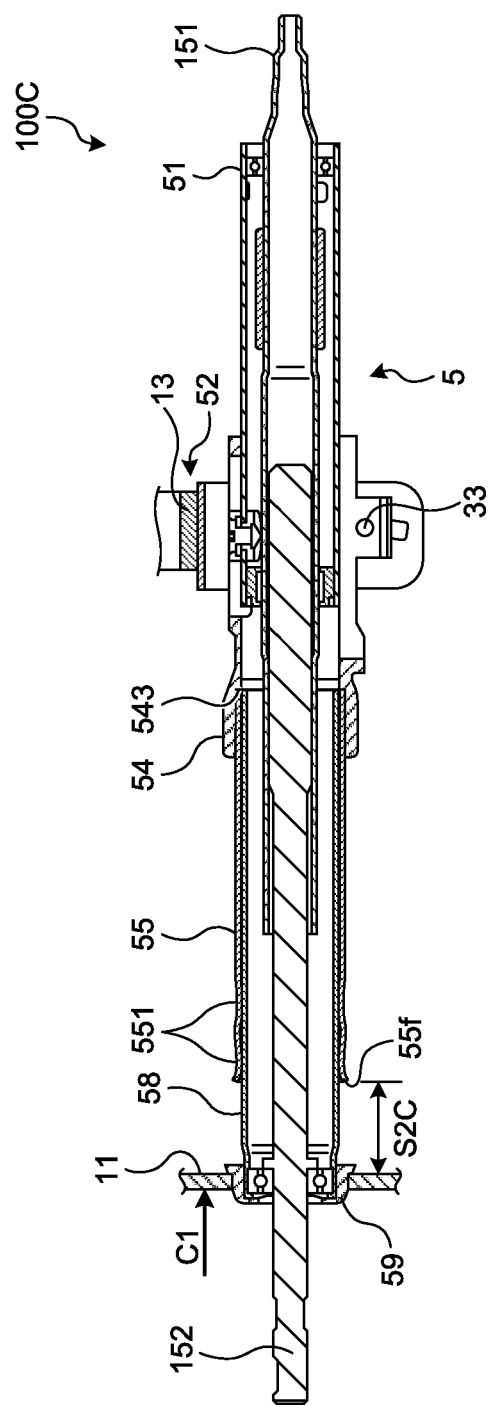
FIG. 19 is a cross-sectional view illustrating the state of the steering device according to the comparative example that has been subjected to a primary collision.
Figure 20:
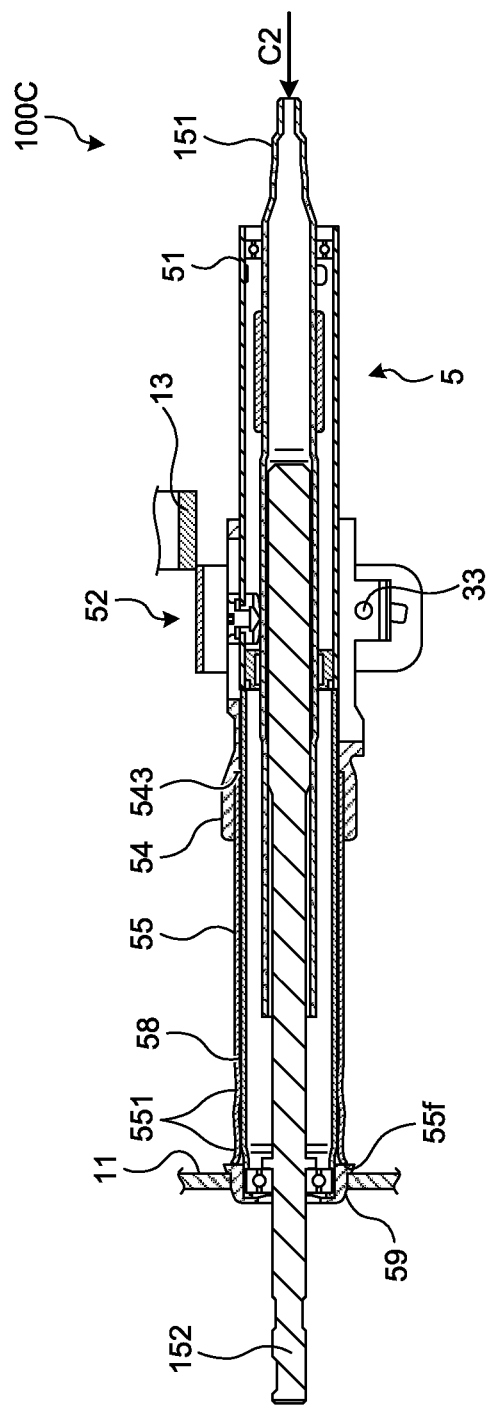
FIG. 20 is a cross-sectional view illustrating the state of the steering device according to the comparative example that has been subjected to a secondary collision.

FIG. 18 is a cross-sectional view illustrating the state of a steering device according to a comparative example that has not yet been subjected to a collision. FIG. 19 is a cross-sectional view illustrating the state of the steering device according to the comparative example that has been subjected to a primary collision. FIG. 20 is a cross-sectional view illustrating the state of the steering device according to the comparative example that has been subjected to a secondary collision. In a steering device 100C according to the comparative example, the vehicle body-side member 13 and the outer column bracket 52 are detachably connected to each other by a capsule or the like. Further, in the steering device 100C, the above-mentioned inner column bracket 4 is not provided and the inner column 51 does not slide relative to the outer column 54 at the time of a secondary collision. In the steering device 100C, a stroke at the time of a primary collision and a stroke at the time of a secondary collision are obtained from the relative movement between the lower column 58 and the intermediate column 55. For example, as illustrated in FIG. 18, a distance between the bush 59 and a front end portion 55f of the intermediate column 55 having not yet been subjected to a collision is equal to the sum of a distance S1C that is equal to a stroke at the time of a primary collision and a distance S2C that is equal to a stroke at the time of a secondary collision.

As illustrated in FIG. 19, a collision load C1 is applied to the dash panel 11 at the time of a primary collision. The lower column 58 moves to the rear side against the friction of the caulked portion 551 due to the collision load C1. Specifically, the lower column 58 moves to the rear side by the distance S1C. Accordingly, the impact of a primary collision is absorbed. However, a predetermined space needs to be formed between the bush 59 and the front end portion 55f of the intermediate column 55 having been subjected to a primary collision so that the lower column 58 and the intermediate column 55 can move relative to each other at the time of a secondary collision. More specifically, the distance between the bush 59 and the front end portion 55f of the intermediate column 55 having been subjected to a primary collision needs to be longer than the distance S2C. For this reason, a stroke at the time of a primary collision is limited to a predetermined stroke or less.

As illustrated in FIG. 20, a collision load C2 is applied to the input shaft 151 at the time of a secondary collision. The capsule, which is a member connecting the vehicle body-side member 13 to the outer column bracket 52, is cut due to the collision load C2, so that the steering column 5 is detached from the vehicle body-side member 13. Then, the inner column 51, the outer column 54, and the intermediate column 55 move to the front side while resisting the friction of the caulked portion 551 as a single body until the front end portion 55f of the intermediate column 55 comes into contact with the bush 59. That is, the inner column 51, the outer column 54, and the intermediate column 55 move to the front side by the distance S2C. Accordingly, the impact of a secondary collision is absorbed.

Figure 21:
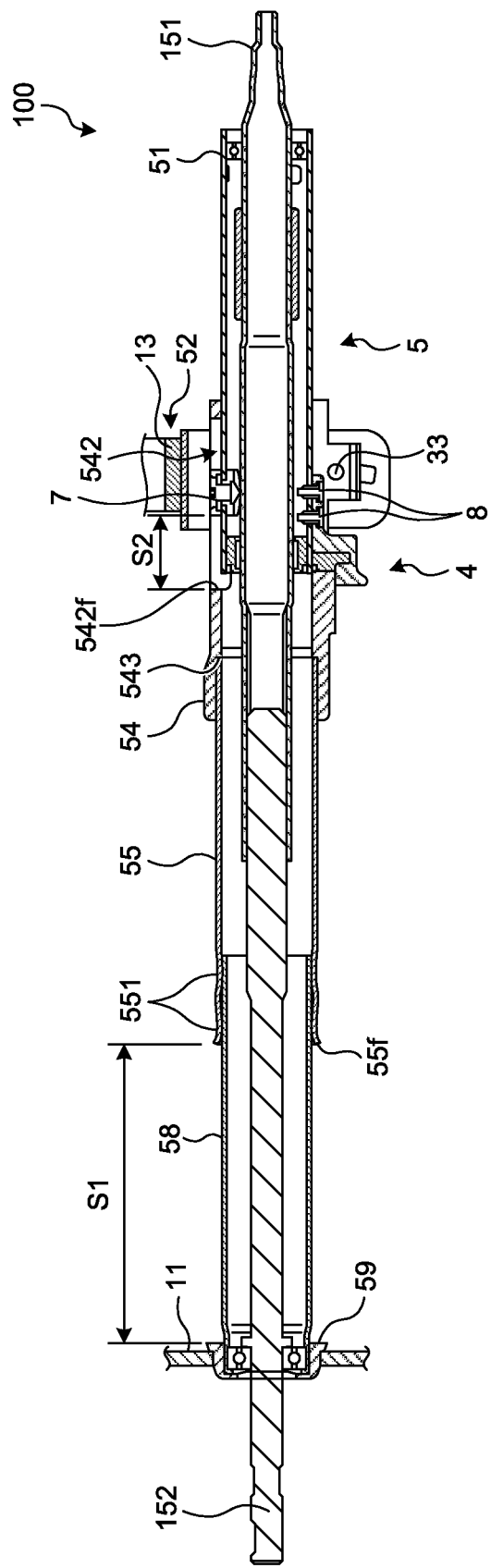
FIG. 21 is a cross-sectional view illustrating the state of the steering device according to this embodiment that has not yet been subjected to a collision.
Figure 22:
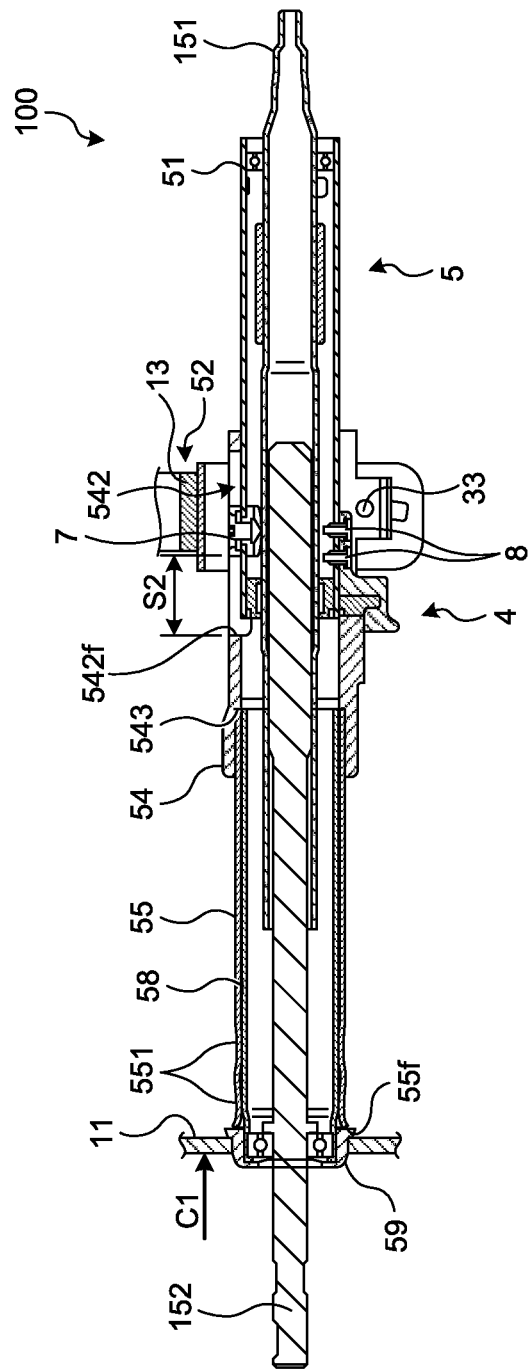
FIG. 22 is a cross-sectional view illustrating the state of the steering device according to this embodiment that has been subjected to a primary collision.
Figure 23:
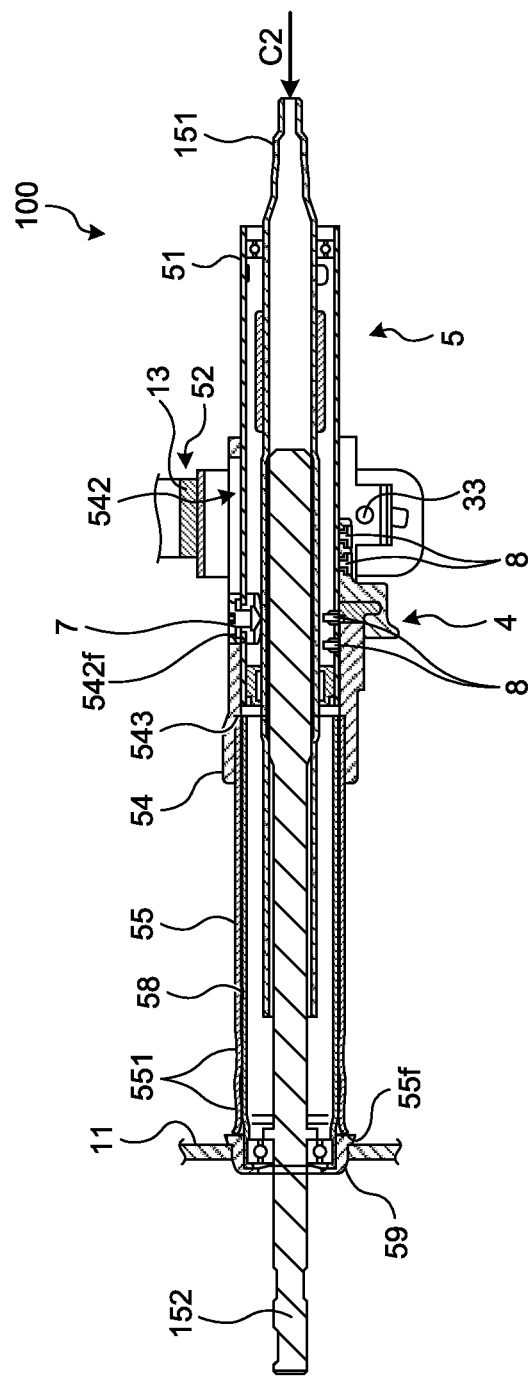
FIG. 23 is a cross-sectional view illustrating the state of the steering device according to this embodiment that has been subjected to a secondary collision.

FIG. 21 is a cross-sectional view illustrating the state of the steering device according to this embodiment that has not yet been subjected to a collision. FIG. 22 is a cross-sectional view illustrating the state of the steering device according to this embodiment that has been subjected to a primary collision. FIG. 23 is a cross-sectional view illustrating the state of the steering device according to this embodiment that has been subjected to a secondary collision. In contrast to the above-mentioned comparative example, in the steering device 100 according to this embodiment, a stroke at the time of a primary collision is obtained from the relative movement between the lower column 58 and the intermediate column 55 and a stroke at the time of a secondary collision is obtained from the relative movement between the inner column 51 and the outer column 54. As illustrated in FIG. 21, a distance between the bush 59 and the front end portion 55f of the intermediate column 55 having not yet been subjected to a collision is the distance S1 that is equal to a stroke at the time of a primary collision.

In FIGS. 21 to 23, the telescopic position of the inner column 51 is present on the front-most side. In the steering device 100 according to this embodiment, a predetermined space is formed between the stopper 7 and the second end portion-inner wall 542f in a state in which the telescopic position of the inner column 51 is present on the front-most side. More specifically, the stopper 7 is present at a position, which is spaced apart from the second end portion-inner wall 542f by a distance S2 equal to a stroke at the time of a secondary collision, in a state in which the telescopic position of the inner column 51 is present on the front-most side. The distance S2 is a distance that is equal to or longer than the distance S2C of the comparative example.

As illustrated in FIG. 22, a collision load C1 is applied to the dash panel 11 at the time of a primary collision. The lower column 58 moves to the rear side while resisting the friction of the caulked portion 551 due to the collision load C1 until the front end portion 55f of the intermediate column 55 comes into contact with the bush 59. That is, the lower column 58 moves to the rear side by a distance S1. Accordingly, the impact of a primary collision is absorbed. In the steering device 100 according to this embodiment, unlike in the above-mentioned comparative example, a predetermined space does not need to be formed between the bush 59 and the front end portion 55f of the intermediate column 55. For this reason, a stroke at the time of a primary collision in the steering device 100 can be made longer than that in the comparative example. Accordingly, the distance S1 is a distance that is longer than the distance SIC of the comparative example.

As illustrated in FIG. 23, a collision load C2 is applied to the input shaft 151 at the time of a secondary collision. The shear pins 8 are cut due to the collision load C2, so that the inner column 51 is detached from the inner column bracket 4. Since a predetermined space is formed between the stopper 7 and the second end portion-inner wall 542f, the inner column 51 can move to the front side while resisting a frictional force generated between the inner column 51 and the outer column 54 (the above-mentioned first frictional force). The inner column 51 moves until the stopper 7 comes into contact with the second end portion-inner wall 542f. That is, the inner column 51 moves to the front side by the distance S2. Further, since the distance S2 is equal to or longer than the distance S2C of the comparative example, a stroke at the time of a secondary collision in the steering device 100 is equal to or longer than that in the comparative example. Since the inner column 51 can move to the front side regardless of the telescopic position of the inner column 51 at the time of a secondary collision in this way, the impact of a secondary collision is absorbed.

The steering device 100 according to this embodiment includes the inner column 51, the outer column 54, and the lower column 58 as described above. The inner column 51 is a cylindrical member that supports the input shaft 151 connected to the steering wheel 14 so as to allow the input shaft 151 to be rotatable. The outer column 54 is a cylindrical member into which at least a part of the inner column 51 is inserted. The lower column 58 is a cylindrical member that supports the output shaft 152 connected to the input shaft 151 so as to allow the output shaft 152 to be rotatable and is supported by the dash panel 11. The lower column 58 moves to the rear side at the time of a primary collision, and the inner column 51 and the outer column 54 move relative to each other at the time of a secondary collision.

Accordingly, an impact at the time of a primary collision is absorbed by the movement of the lower column 58, and an impact at the time of a secondary collision is absorbed by the movement of the inner column 51. Further, even though the movable distance of the inner column 51 at the time of a secondary collision is set to be long, the movable distance of the lower column 58 at the time of a primary collision is not shortened. Accordingly, the steering device 100 according to this embodiment can improve both energy absorption capability at the time of a primary collision and energy absorption capability at the time of a secondary collision.

More specifically, the steering device 100 according to this embodiment includes the inner column 51, the outer column 54, the lower column 58, the cuter column bracket 52, the inner column bracket 4, and the shear pins 8. The inner column 51 is a cylindrical member which supports the input shaft 151 connected to the steering wheel 14 so as to allow the input shaft 151 to be rotatable and in which the first holes 51h are formed. The outer column 54 is a cylindrical member into which at least a part of the inner column 51 is inserted and which includes the first slit 541 formed by notching one end of the outer column 54 into which the inner column 51 is inserted. The lower column 58 is a cylindrical member that supports the output shaft 152 connected to the input shaft 151 so as to allow the output shaft 152 to be rotatable and is supported by the dash panel 11. The outer column bracket 52 is fixed to the vehicle body-side member 13 and clamps and supports the outer column 54 together with the holding force-increasing members (the first telescopic friction plates 21). The inner column bracket 4 is supported by the holding force-increasing members (the first telescopic friction plates 21), and the second holes 43h are formed in the inner column bracket 4. The shear pins 8 connect the inner column bracket 4 to the inner column 51 at the positions across the first and second holes 51h and 43h so that the inner column bracket 4 and the inner column 51 are detachable from each other. The inner wall of the outer column 54 is in contact with the outer wall of the inner column 51 in a state in which the outer column 54 is clamped, and the telescopic position of the inner column 51 can be adjusted in a state in which the clamping of the outer column 54 is released.

In the steering device 100 according to this embodiment, the lower column 58 moves to the rear side when a collision load is applied to the dash panel 11 at the time of a primary collision. Further, when a collision load is applied to the steering wheel 14 at the time of a secondary collision, the collision load is transmitted to the inner column 51 through the input shaft 151. On the other hand, the inner column bracket 4 supported by the first telescopic friction plates 21 does not move. For this reason, since a shear force is applied to the shear pins 8, the shear pins 8 are cut in a case in which the collision load exceeds the allowable shear force of the shear pins 8. Since the connection between the inner column 51 and the inner column bracket 4 is released when the shear pins 8 are cut, the inner column 51 is supported by a frictional force between the inner column 51 and the outer column 54. Accordingly, the inner column 51 and the outer column 54 can move relative to each other. Therefore, in the steering device 100, a stroke at the time of a primary collision is obtained from the rearward movement of the lower column 58 and a stroke at the time of a secondary collision is obtained from the forward movement of the inner column 51. That is, a mechanism, which absorbs energy at the time of a secondary collision, is formed of a different member that is provided at a position different from the position of a mechanism for absorbing energy at the time of a primary collision. Accordingly, the steering device 100 according to this embodiment can improve both energy absorption capability at the time of a primary collision and energy absorption capability at the time of a secondary collision.

Furthermore, even though the shear pins 8 are cut, the outer column 54 continues to be supported by the outer column bracket 52 fixed to the vehicle body-side member 13. Moreover, the inner column 51 continues to be supported by the outer column 54. For this reason, even though the shear pins 8 are cut, the steering column 5 does not fall. Accordingly, even though the setting value of a detachment load at which the steering column 5 moves to the front side (the allowable shear force of the shear pins 8) is reduced, the steering device 100 according to this embodiment can suppress the fall of the steering column 5 caused by the malfunction.

In the steering device 100 according to this embodiment, the outer column 54 includes the second slit 542 that is provided at a position different from the position of the first slit 541 and that is an elongated hole extending in the axial direction of the outer column 54. The stopper 7 is mounted on a portion of the inner column 51 exposed to the second slit 542. The stopper 7 comes into contact with the second end portion-inner wall 542f, which is formed on the front side of the second slit 542, after a secondary collision.

Accordingly, since a stroke at the time of a secondary collision is regulated to a predetermined value or less, the excessive forward movement of the inner column 51 at the time of a secondary collision is suppressed. For this reason, the position of the steering wheel 14 after a secondary collision is kept within a predetermined range. Accordingly, the steering device 100 allows the steering wheel 14 to be easily operated after a secondary collision.

In the steering device 100 according to this embodiment, the inner column bracket 4 comes into contact with the first end portion-inner wall 541f, which is the inner wall of the front end portion of the first slit 541, according to the adjustment of a telescopic position. In a state in which the inner column bracket 4 is in contact with the first end portion-inner wall 541f, the stopper 7 is present at a position deviating from the second end portion-inner wall 542f.

Accordingly, even though the telescopic position of the inner column 51 is present on the front-most side, the inner column 51 can move to the front side at the time of a secondary collision. That is, regardless of the telescopic position of the inner column 51, the inner column 51 can move to the front side at the time of a secondary collision. Accordingly, the steering device 100 can improve energy absorption capability at the time of a secondary collision regardless of the telescopic position of the inner column 51.

The steering device 100 according to this embodiment includes the intermediate column 55 that is fitted to the front side of the outer column 54 and is fitted to the rear side of the lower column 58.

In order to guide the lower column 58 at the time of a primary collision, a member fitted to the front portion of the lower column 58 needs to have a predetermined length or more. In the steering device 100, the intermediate column 55 guides the lower column 58. Accordingly, since the length of the outer column 54 in the axial direction is shortened in the steering device 100, the outer column 54 is easily manufactured.

In the steering device 100 according to this embodiment, the lower column 58 includes the bush 59 that is an annular elastic member and is provided at a position corresponding to the through-hole 111 formed in the dash panel 11.

Accordingly, since the bush 59 is elastically deformable, the lower column 58 can oscillate about the front end portion thereof. That is, the lower column 58 can oscillate in the tilt direction within the elastic deformation range of the bush 59. For this reason, the tilt position of the steering device 100 can be adjusted.

In the steering device 100 according to this embodiment, each of the holding force-increasing members (the first telescopic friction plates 21) is a plate-like member including an elongated hole (the telescopic adjustment hole 21h) that extends in the axial direction of the outer column 54.

Accordingly, machining required to form the holding force-increasing member becomes less. For this reason, the steering device 100 is more easily manufactured.

In the steering device 100 according to this embodiment, the holding force-increasing members (the first telescopic friction plates 21) are disposed on both sides of the outer column 54. The inner column bracket 4 is connected to each of the holding force-increasing members (the first telescopic friction plates 21) that are disposed on both sides of the outer column 54.

Accordingly, when a load is applied to the inner column bracket 4, the inner column bracket 4 receives clamping forces from both sides of the outer column 54. For this reason, the posture of the inner column bracket 4, when the shear pins 8 are cut, is stable. Accordingly, the posture of the inner column 51, when the inner column 51 starts to move, is easily kept straight in the axial direction. Therefore, the inner column 51 easily moves straight in the axial direction.

In the steering device 100 according to this embodiment, each of the shear pins 8 is a cylindrical member that includes a guide hole 81h passing through the other end of the cylindrical member from one end of the cylindrical member, and includes the outer pin 81 that passes through the first and second holes 51h and 43h and the inner pin 82 that passes through the guide hole 81h and pushes the inner wall of the guide hole 81h to the outside in the radial direction of the guide hole 81h.

Accordingly, since the inner pins 82 are inserted to assemble the steering device 100 after the first and second holes 51h and 43h are positioned by the outer pins 81, the steering device 100 can be easily assembled.

The steering device 100 according to this embodiment includes the damper 9 that is mounted on the inner column bracket 4 and that faces the first end portion-inner wall 541f, which is the inner wall of the front end portion of the first slit 541, in the axial direction of the outer column 54.

Therefore, when the telescopic position is present on the front-most side, the damper 9 comes into contact with the first end portion-inner wall 541f. When a force is applied to the inner column 51 in a state in which the damper 9 is in contact with the first end portion-inner wall 541*f*, a reaction force from the first end portion-inner wall 541*f* is applied to the damper 9. Accordingly, since the damper 9 is elastically deformed, a part of the force applied to the damper 9 is consumed to elastically deform the damper 9. Therefore, a force smaller than the force applied to the damper 9 is transmitted to the inner column bracket 4 and a shear force having substantially the same magnitude as the magnitude of the force transmitted to the inner column bracket 4 acts on the shear pins 8. For this reason, the shear force acting on the shear pins 8 is smaller than the force applied to the inner column 51. Accordingly, the steering device 100 can protect a detachment mechanism by suppressing the cutting of the shear pins 8 when the telescopic adjustment is performed.

REFERENCE SIGNS LIST

10 VEHICLE BODY
11 DASH PANEL
111 THROUGH-HOLE
13 VEHICLE BODY-SIDE MEMBER
14 STEERING WHEEL
15 STEERING SHAFT
151 INPUT SHAFT
152 OUTPUT SHAFT
16 UNIVERSAL JOINT
17 LOWER SHAFT
18 UNIVERSAL JOINT
19 PINION SHAFT
100 STEERING DEVICE
21 FIRST TELESCOPIC FRICTION PLATE (HOLDING FORCE-INCREASING MEMBER)
22 SECOND TELESCOPIC FRICTION PLATE
31 ROD THROUGH-PORTION
33 ROD
4 INNER COLUMN BRACKET
43*h* SECOND HOLE
5 STEERING COLUMN
51 INNER COLUMN
51*h* FIRST HOLE
52 OUTER COLUMN BRACKET
53 OPERATION LEVER
54 OUTER COLUMN
541 FIRST SLIT
541*f* FIRST END PORTION-INNER WALL
542 SECOND SLIT
542*f* SECOND END PORTION-INNER WALL
542*b* THIRD END PORTION-INNER WALL
55 INTERMEDIATE COLUMN
551 CAULKED PORTION
55*f* FRONT END PORTION
58 LOWER COLUMN
59 BUSH
7 STOPPER
8 SHEAR PIN
81 OUTER PIN
82 INNER PIN
9 DAMPER
BK CUT SURFACE
C1, C2 COLLISION LOAD
Zr ROTATION AXIS

The invention claimed is:
1. A steering device comprising:
a cylindrical inner column that supports an input shaft connected to a steering wheel so as to allow the input shaft to be rotatable;
a cylindrical outer column into which at least a part of the inner column is inserted; and
a cylindrical lower column that supports an output shaft connected to the input shaft so as to allow the output shaft to be rotatable and is supported by a dash panel,
a first hole that is provided in the inner column;
a first slit of the outer column that is formed by notching one end of the outer column, the one end being a side into which the inner column is inserted;
an outer column bracket that is fixed to a vehicle body-side member and clamps and supports the outer column together with holding force-increasing members;
an inner column bracket which is supported by the holding force-increasing members and in which a second hole is formed; and
a shear pin that connects the inner column bracket to the inner column at a position across the first and second holes so that the inner column bracket and the inner column are detachable from each other,
wherein the lower column moves to a rear side at the time of a primary collision, and the inner column and the outer column move relative to each other at the time of a secondary collision, and
wherein an inner wall of the outer column is in contact with an outer wall of the inner column in a state in which the outer column is clamped, and a telescopic position of the inner column is adjustable in a state in which the clamping of the outer column is released.

2. The steering device according to claim 1,
wherein the outer column includes a second slit that is provided at a position different from the position of the first slit, the second slit being an elongated hole extending in an axial direction of the outer column,
a stopper is mounted on a portion of the inner column exposed to the second slit, and
the stopper comes into contact with a second end portion-inner wall after a secondary collision, the second end portion-inner wall being an inner wall of a front end portion of the second slit.

3. The steering device according to claim 2,
wherein the inner column bracket comes into contact with a first end portion-inner wall according to the adjustment of the telescopic position of the inner column, the first end portion-inner wall being an inner wall of a front end portion of the first slit, and
in a state in which the inner column bracket is in contact with the first end portion-inner wall, the stopper is present at a position deviating from the second end portion-inner wall.

4. The steering device according to claim 1, further comprising:
an intermediate column that is fitted to a front side of the outer column and is fitted to a rear side of the lower column.

5. The steering device according to claim 1,
wherein the lower column includes a bush that is an annular elastic member, the bush being provided at a position corresponding to a through-hole provided in the dash panel.

6. The steering device according to claim 1,
wherein the holding force-increasing member is a plate-like member that includes an elongated hole extending in the axial direction of the outer column.

7. The steering device according to claim 1,
wherein the holding force-increasing members are disposed on both sides of the outer column, and the inner column bracket is connected to each of the holding force-increasing members that are disposed on both sides of the outer column.

8. The steering device according to claim 1, wherein the shear pin is a cylindrical member that includes a guide hole passing through the other end of the cylindrical member from one end of the cylindrical member, the shear pin including an outer pin that passes through the first and second holes and an inner pin that passes through the guide hole and pushes an inner wall of the guide hole to the outside in a radial direction of the guide hole.

9. The steering device according to claim 1, further comprising:
a damper that is mounted on the inner column bracket and faces the inner wall of the front end portion of the first slit, in the axial direction of the outer column.

\* \* \* \* \*